United States Patent
Sato

(10) Patent No.: US 9,520,805 B2
(45) Date of Patent: Dec. 13, 2016

(54) CONTROL METHOD AND CONTROL SYSTEM OF THREE LEVEL INVERTER

(71) Applicant: FUJI ELECTRIC CO., LTD., Kawasaki-shi (JP)

(72) Inventor: Ikuya Sato, Sagamihara (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/824,454

(22) Filed: Aug. 12, 2015

(65) Prior Publication Data

US 2016/0072406 A1    Mar. 10, 2016

(30) Foreign Application Priority Data

Aug. 19, 2014 (JP) ................. 2014-166375

(51) Int. Cl.
| | |
|---|---|
| H02M 7/537 | (2006.01) |
| H02M 7/483 | (2007.01) |
| H02M 7/487 | (2007.01) |
| H02M 1/00 | (2006.01) |

(52) U.S. Cl.
CPC ............ *H02M 7/537* (2013.01); *H02M 7/483* (2013.01); *H02M 7/487* (2013.01); *H02M 2001/009* (2013.01); *H02M 2001/0054* (2013.01)

(58) Field of Classification Search
CPC ...... H02M 7/483; H02M 7/487; H02M 7/537; H02M 2001/0054; H02M 2001/009
See application file for complete search history.

(56) References Cited

U.S. PATENT DOCUMENTS

| | | | | |
|---|---|---|---|---|
| 5,517,401 | A * | 5/1996 | Kinoshita | B60L 11/1803 363/132 |
| 6,337,804 | B1* | 1/2002 | Kea | H02M 7/487 363/132 |
| 7,426,122 | B2* | 9/2008 | Kimata | H02M 7/53873 318/811 |
| 7,573,732 | B2* | 8/2009 | Teichmann | H02M 1/32 363/37 |
| 9,252,670 | B2* | 2/2016 | Schroeder | H02M 3/33507 |
| 2003/0214824 | A1* | 11/2003 | Corzine | H02M 7/487 363/71 |

(Continued)

FOREIGN PATENT DOCUMENTS

| | | |
|---|---|---|
| EP | 2424100 A2 | 2/2012 |
| JP | 2007-282484 A | 10/2007 |

(Continued)

*Primary Examiner* — Timothy J Dole
*Assistant Examiner* — Yusef Ahmed
(74) *Attorney, Agent, or Firm* — Rabin & Berdo, P.C.

(57) ABSTRACT

A three-phase inverter includes three-level inverters connected in parallel to one another, each being capable of outputting a DC high voltage, DC middle voltage, and DC low voltage. A method for controlling the three-phase inverter produces on-time ratios in one switching period of switching elements in the three-level inverters, so as to make the three-phase inverter for one phase alternately output the DC high voltage and the DC middle voltage, to make the three-phase inverter for another phase output the DC middle voltage, and to make the three-phase inverter for the remaining phase alternately output the DC middle voltage and the DC low voltage.

12 Claims, 23 Drawing Sheets

(56) References Cited

U.S. PATENT DOCUMENTS

| | | | |
|---|---|---|---|
| 2004/0057262 A1* | 3/2004 | Tanaka | H02M 7/487 363/132 |
| 2005/0111246 A1* | 5/2005 | Lai | H02M 5/225 363/157 |
| 2006/0197491 A1* | 9/2006 | Nojima | H02M 7/487 318/801 |
| 2006/0213890 A1* | 9/2006 | Kooken | B23K 9/095 219/130.21 |
| 2008/0049469 A1* | 2/2008 | Odaka | H02M 5/271 363/74 |
| 2008/0291698 A1 | 11/2008 | Yamamoto et al. | |
| 2008/0298103 A1* | 12/2008 | Bendre | H02M 7/487 363/89 |
| 2010/0219692 A1* | 9/2010 | Flury | H02M 7/487 307/84 |
| 2011/0141779 A1* | 6/2011 | Joseph | H02M 7/487 363/95 |
| 2012/0155135 A1 | 6/2012 | Fujii | |
| 2012/0307533 A1* | 12/2012 | Gekeler | H02M 7/487 363/41 |
| 2013/0343103 A1* | 12/2013 | Takizawa | H02H 7/1203 363/53 |
| 2014/0191582 A1* | 7/2014 | Deboy | H02J 3/383 307/82 |
| 2014/0346884 A1 | 11/2014 | Fujita et al. | |
| 2014/0369088 A1* | 12/2014 | Yoo | H02M 5/458 363/37 |
| 2015/0015072 A1* | 1/2015 | Deboy | H02M 7/537 307/52 |
| 2015/0023080 A1* | 1/2015 | Chambon | H02M 1/0845 363/131 |
| 2015/0028794 A1* | 1/2015 | Flett | H02M 7/537 320/101 |
| 2015/0092467 A1* | 4/2015 | Nagarajan | H02M 7/53871 363/132 |
| 2015/0194908 A1* | 7/2015 | Wang | H02M 7/483 363/131 |
| 2015/0236609 A1* | 8/2015 | Kato | H02M 7/06 363/78 |

FOREIGN PATENT DOCUMENTS

| | | |
|---|---|---|
| JP | 2010-206931 A | 9/2010 |
| JP | 2012-070498 A | 4/2012 |
| JP | 2013-192424 A | 9/2013 |

* cited by examiner

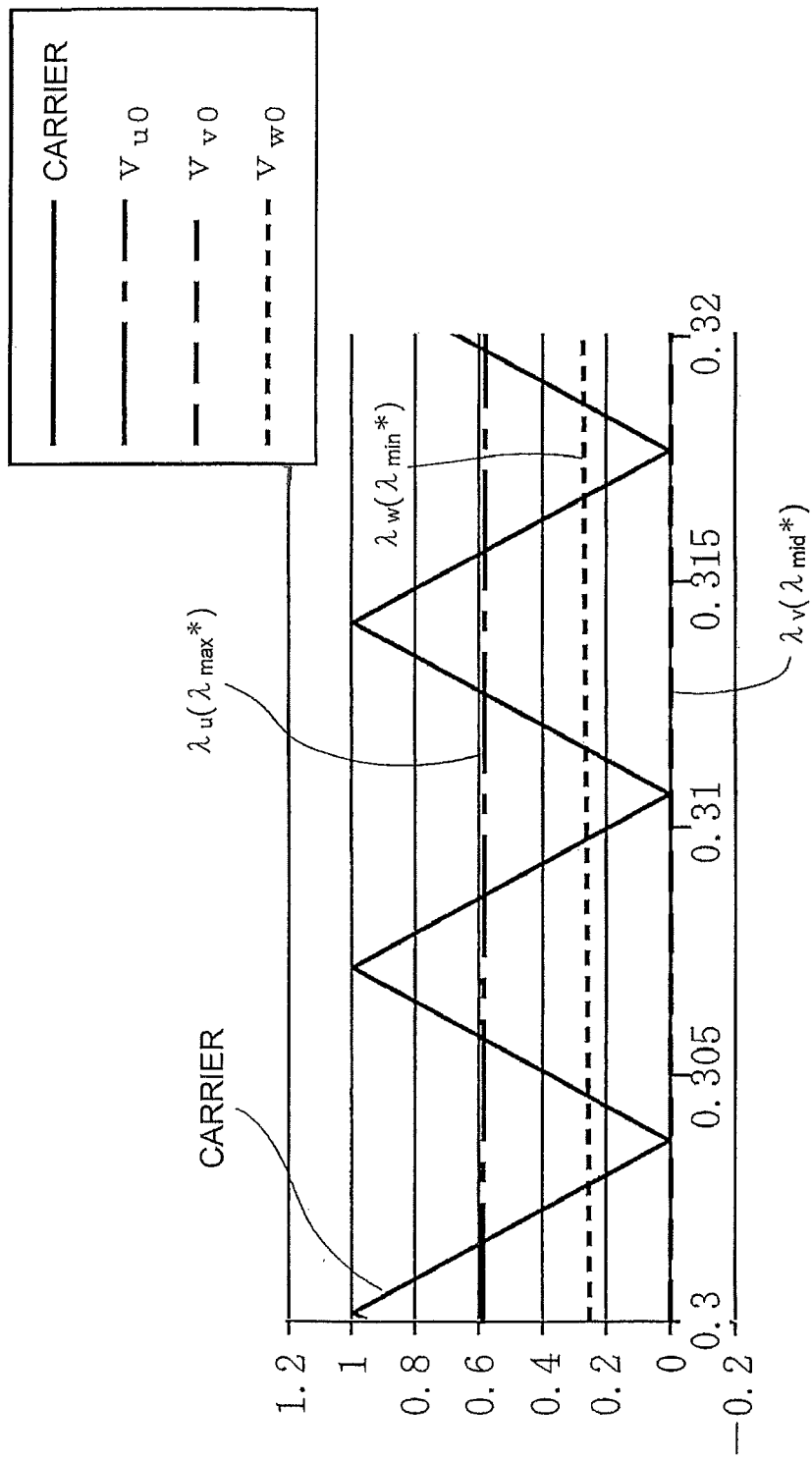

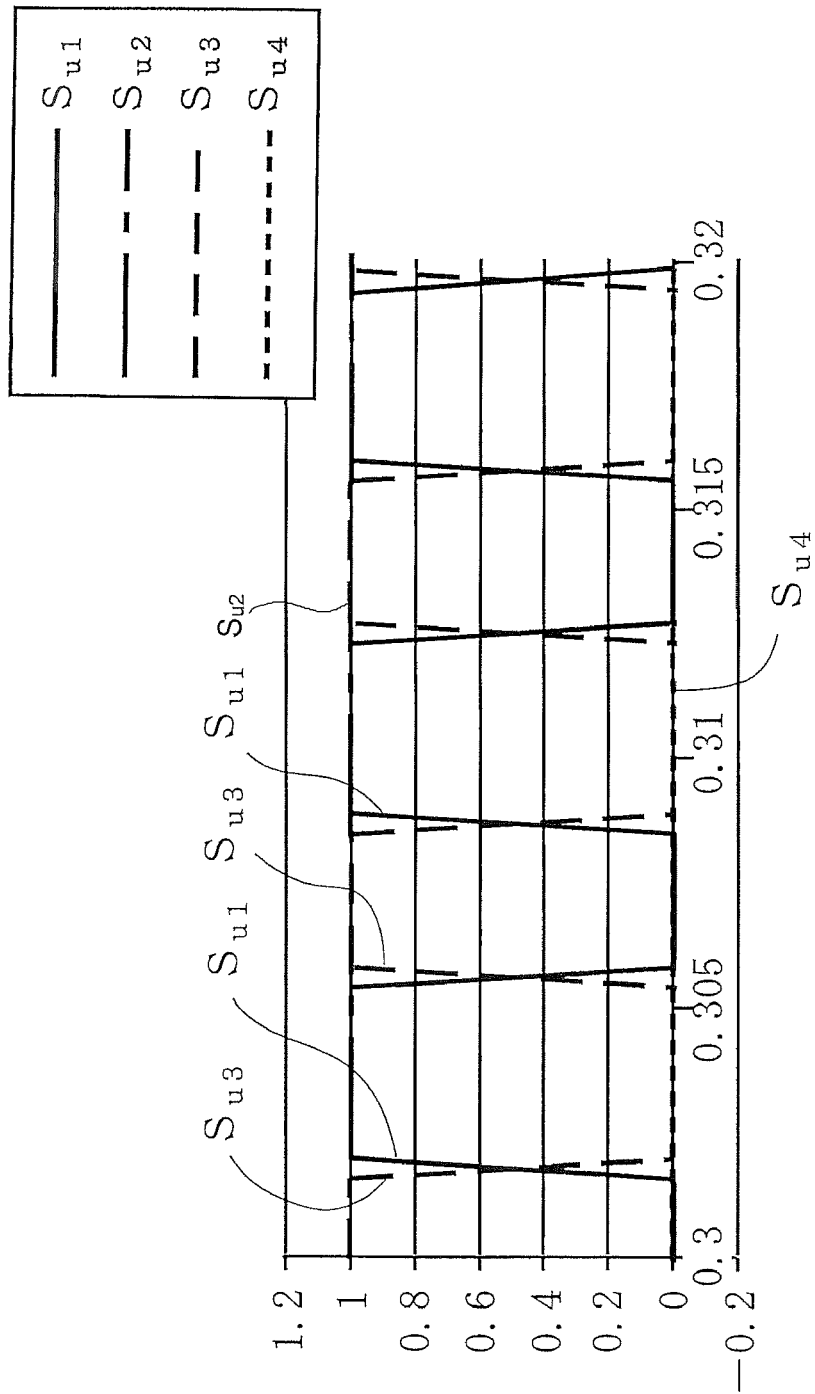

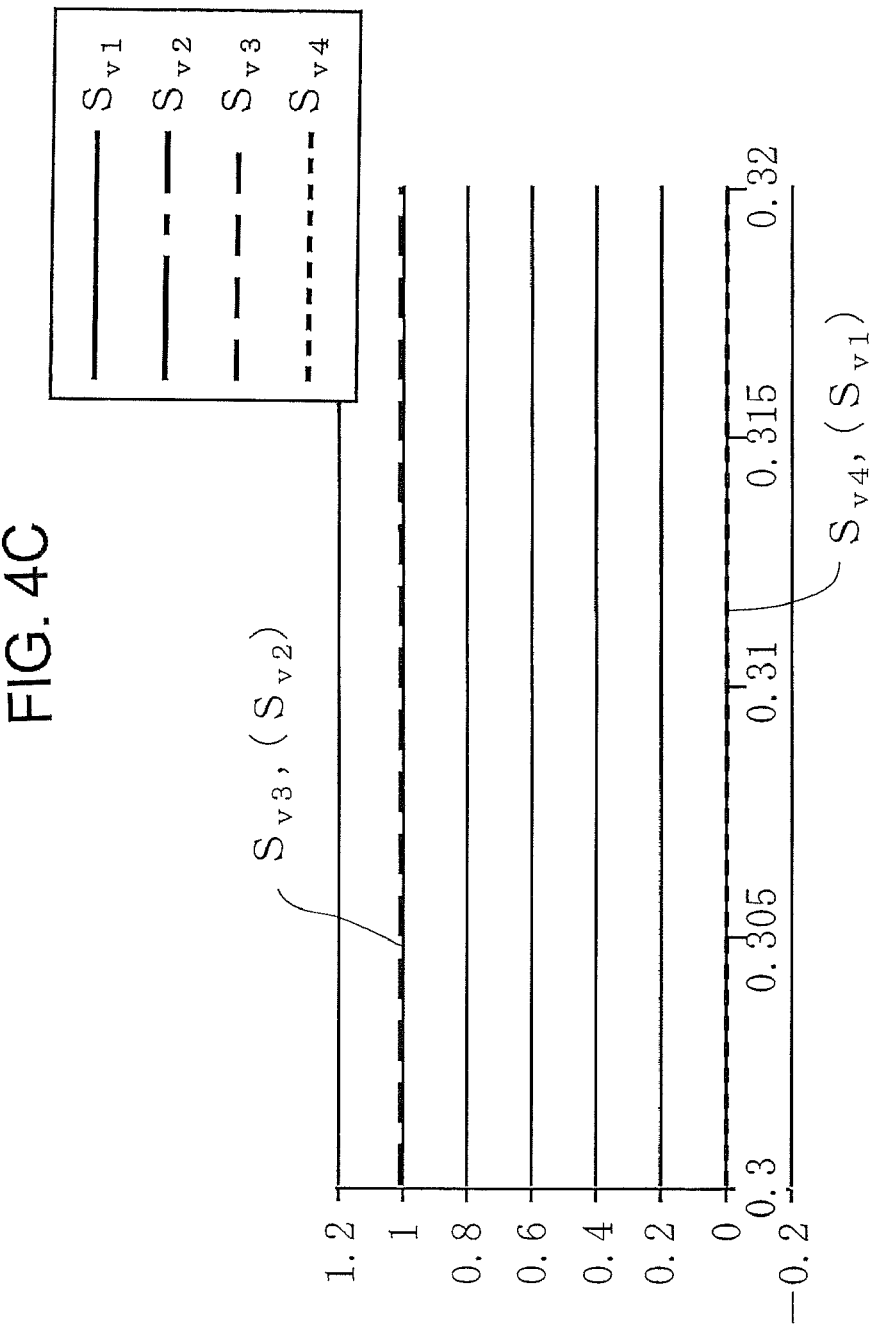

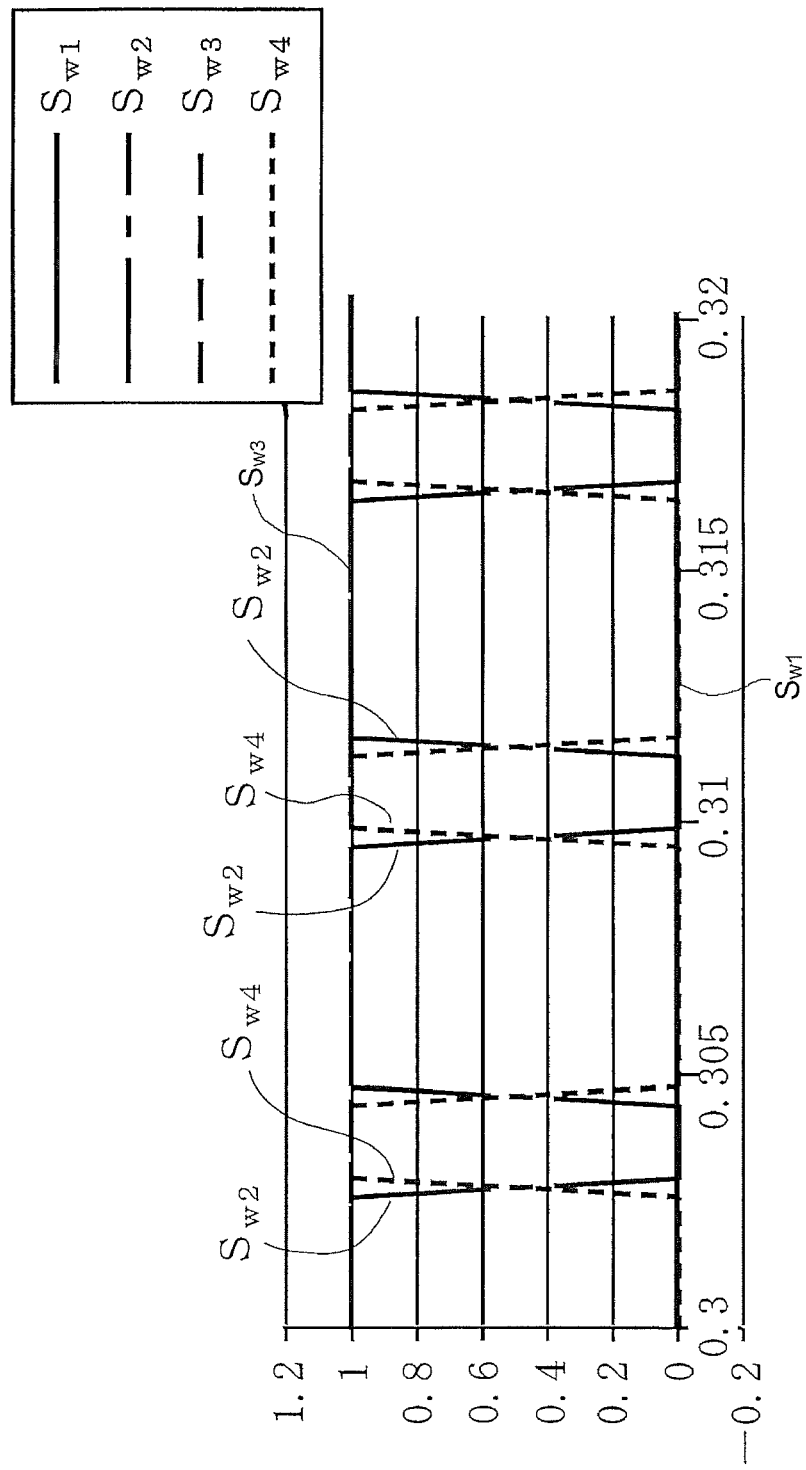

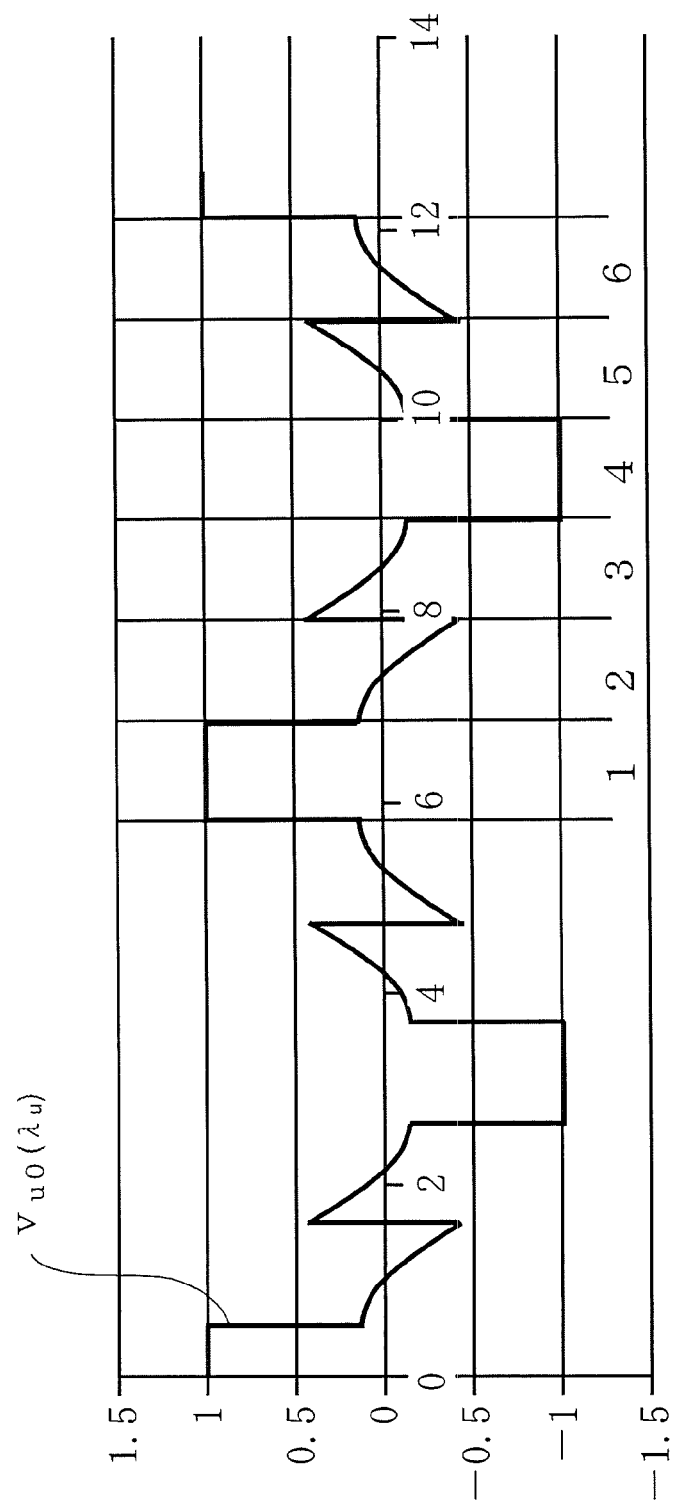

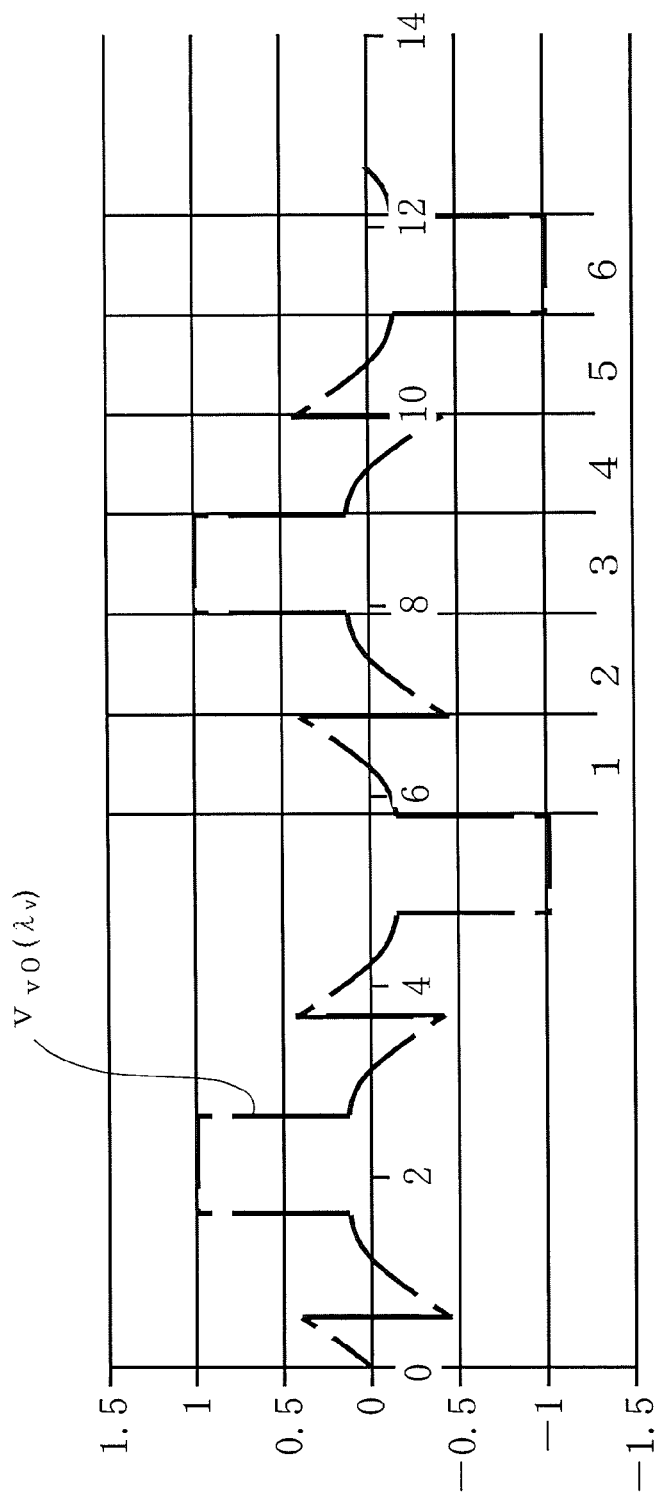

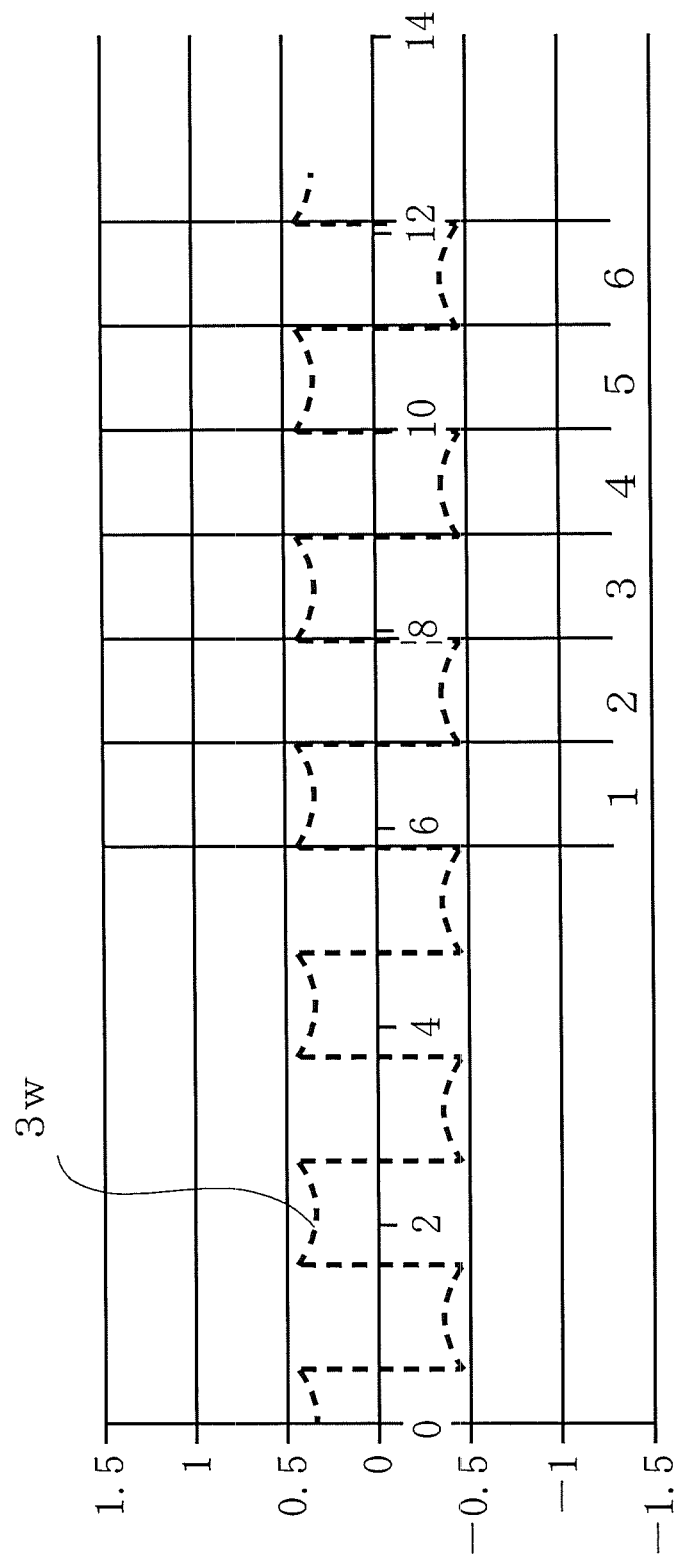

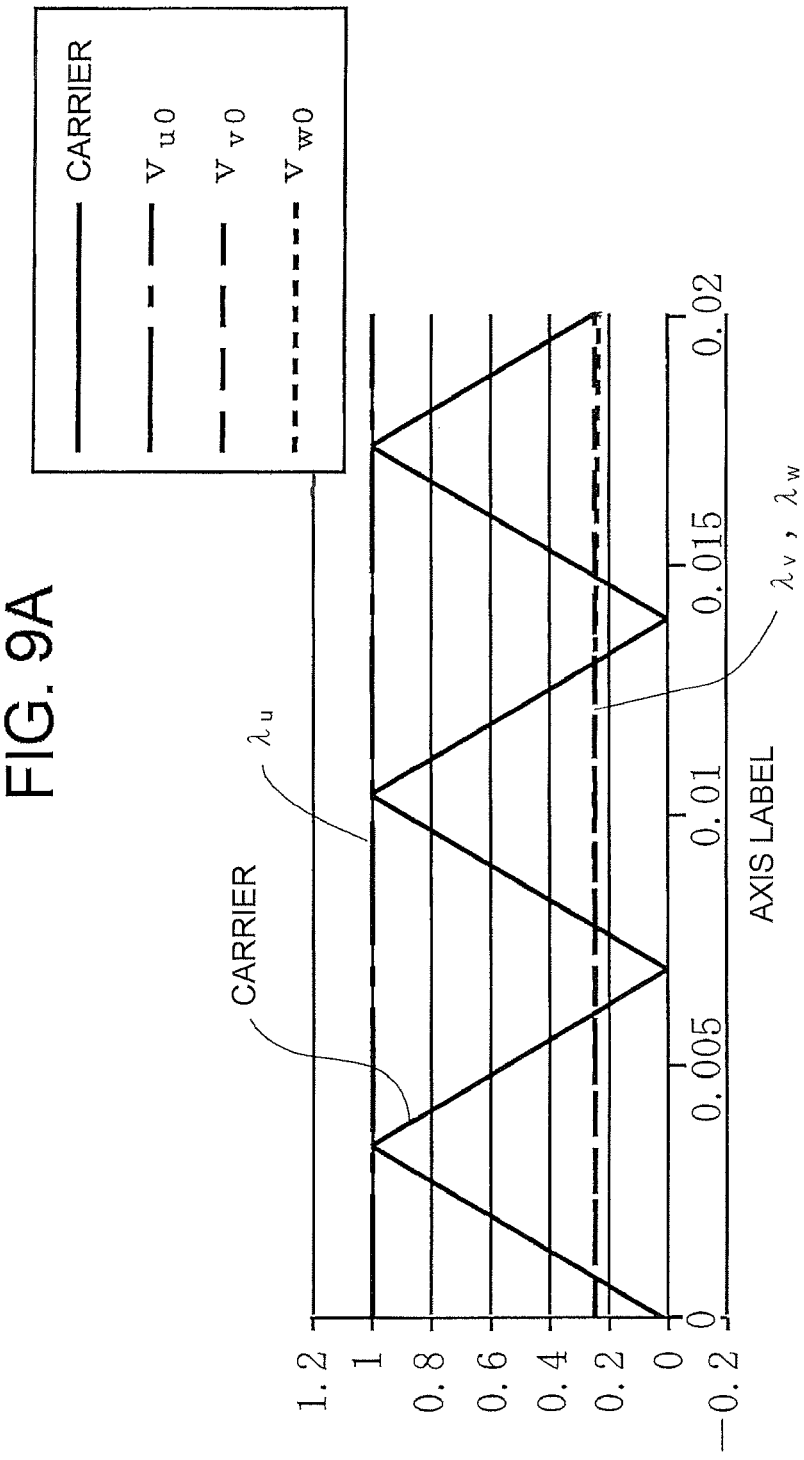

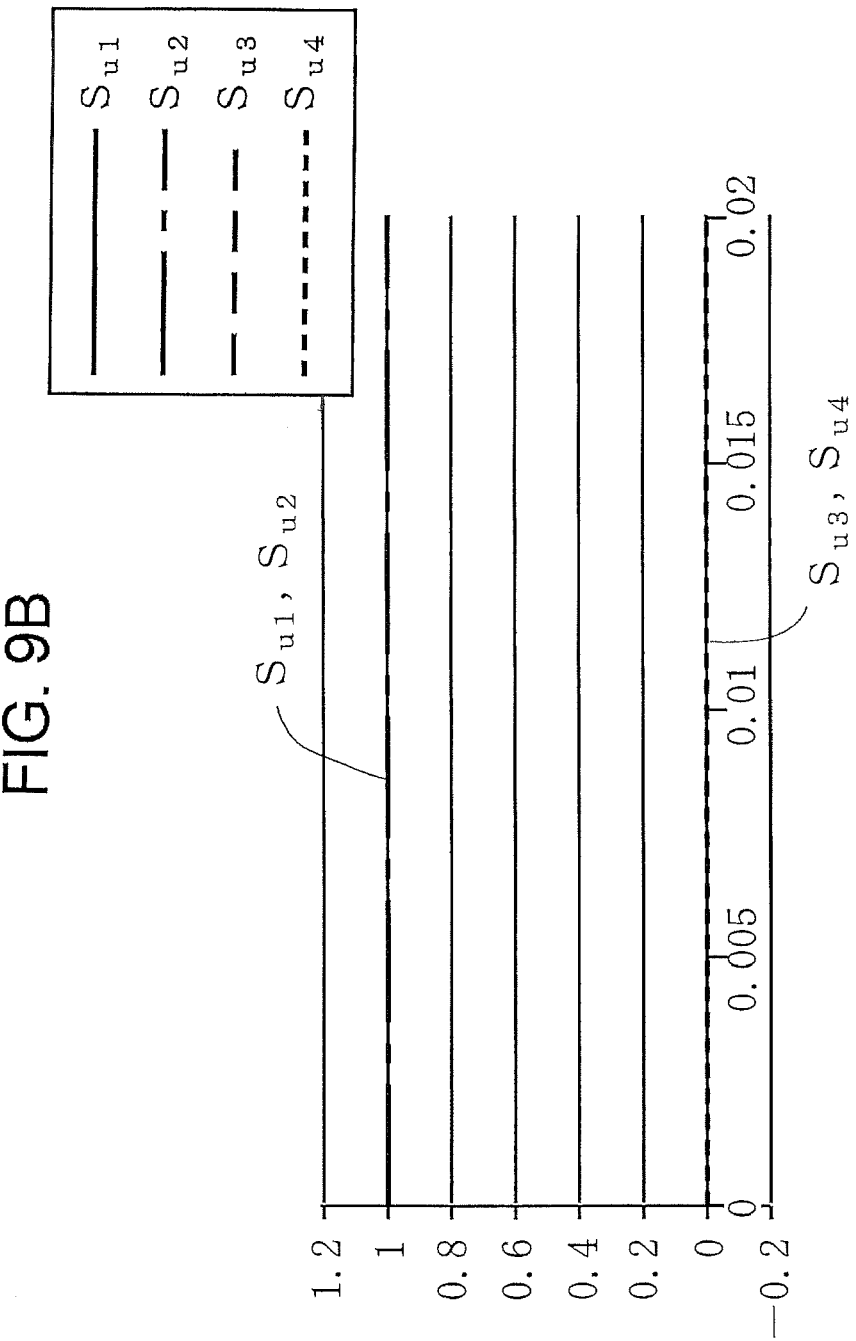

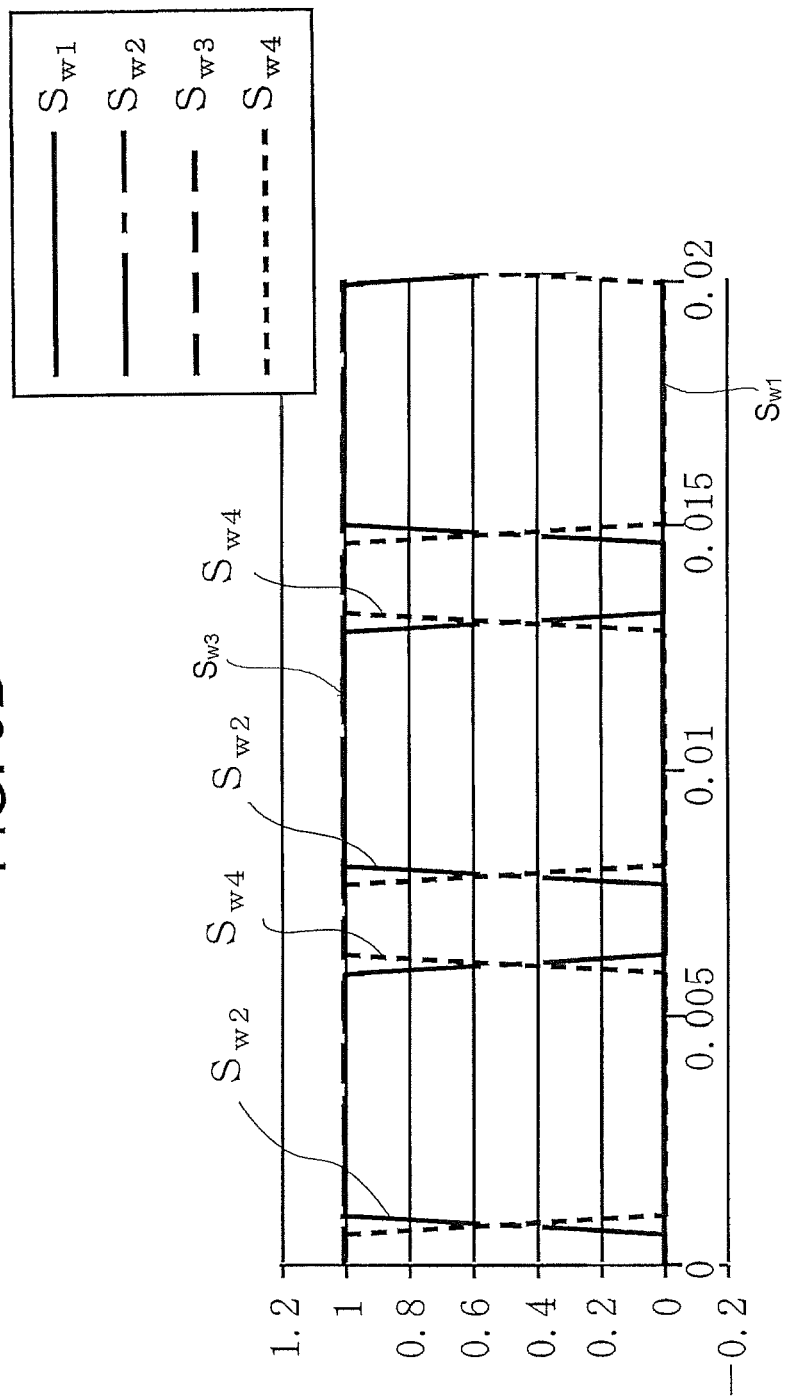

CONTROL METHOD AND CONTROL SYSTEM OF THREE LEVEL INVERTER

CROSS-REFERENCE TO RELATED APPLICATION

This application claims the benefit of foreign priority of Japanese application number 2014-166375, filed Aug. 19, 2014. The disclosure of this earlier application is incorporated herein by reference.

BACKGROUND OF INVENTION

1. Field of the Invention

The present invention relates to a control method and a control system in a three-level inverter which outputs an AC voltage in three levels converted from a DC voltage by carrying out the switching of the DC voltage with the use of semiconductor switching elements, the control method and the control system enabling the inverter to reduce the number of times of the switching and to expand the range of the output voltage.

2. Background Art

FIG. 13 is a circuit diagram showing the circuit configuration of an example of a common three-level inverter with respect to the circuit of one phase. Here, for simplifying the explanation, the circuit configuration with respect to only one phase (U-phase) of the output circuits of three phases is shown.

In FIG. 13, the three-level inverter is provided with DC power supplies 101 and 102 (letting each of the voltage values thereof be $E_d$), semiconductor switching elements $S_1$ to $S_4$ such as IGBTs and diodes $D_1$ and $D_2$. Signs N and U designate a neutral point and an output terminal, respectively. In the following explanations, in a DC circuit, the positive electrode of the DC power supply 101, the negative electrode of the DC power supply 102 and the neutral point N are to be also referred to as a high voltage point, a low voltage point and a middle voltage point, respectively. Moreover, the voltage $E_d$, the voltage $-E_d$ and a voltage 0 are to be referred to as a DC high voltage, a DC low voltage and a DC middle voltage, respectively.

In the three-level inverter, by the turning-on and -off operations of the semiconductor switching elements $S_1$ to S4 connected in series and the action of the diodes $D_1$ and $D_2$, it is possible to output the voltages at three levels in the DC circuit, namely the voltages $E_d$, 0, and $-E_d$ (here, the voltages drop at each element is ignored).

For example, with the semiconductor switching elements $S_1$ and $S_2$ being turned-on and the semiconductor switching elements $S_3$ and $S_4$ being turned-off, an output voltage becomes $E_d$, with the semiconductor switching elements $S_2$ and $S_3$ being turned-on and the semiconductor switching elements $S_1$ and $S_4$ being turned-off, an output voltage becomes 0, and with the semiconductor switching elements $S_3$ and $S_4$ being turned-on and the semiconductor switching elements $S_1$ and $S_2$ being turned-off, an output voltage becomes $-E_d$.

FIG. 14 is a circuit diagram showing the circuit configuration of another example of a common three-level inverter with respect to the circuit of one phase.

In FIG. 14, the configuration of the circuit of a three-level inverter is shown with respect to one phase in which inverter the diodes $D_1$ and $D_2$ in the three-level inverter shown in FIG. 13 are omitted and a bidirectional switch $S_{23}$ formed of the semiconductor switching elements $S_2$ and $S_3$ is used.

The levels of the output voltages of the three-level inverter are the same as the levels of the output voltages of the three-level inverter shown in FIG. 13. For example, with the semiconductor switching element $S_1$ being turned-on and with the semiconductor switching elements $S_2$ to $S_4$ being turned-off, the output voltage becomes $E_d$, with the semiconductor switching elements $S_2$ and $S_3$ being turned-on and with the semiconductor switching elements $S_1$ and $S_4$ being turned-off, the output voltage becomes 0, and with the semiconductor switching element $S_4$ being turned-on and with the semiconductor switching elements $S_1$ to $S_3$ being turned-off, the output voltage becomes $-E_d$.

In this way, the three-level inverter, by outputting voltages at three levels, can relax an abrupt change in a voltage applied to a load compared with a two-level inverter. In particular, when a motor is connected as a load, such a three-level inverter is effective in inhibiting a surge voltage to allow the three-level inverter to be widely used.

Here, for a control method of a three-level inverter, there is the method described in each of JP-A-2007-282484 (paragraphs [0008] to [0028] and FIG. 1 to FIG. 3, etc.) and JP-A-2010-206931 (paragraphs [0027] to [0036] and FIG. 1 to FIG. 3, etc.).

In JP-A-2007-282484 (paragraphs [0008] to [0028] and FIG. 1 to FIG. 3, etc.), a method is described in which an output voltage is provided on the basis of the frequency command or the amplitude command of an output voltage command with a dipolar modulation method carried out in a low output voltage region, a unipolar modulation method carried out in a middle output voltage region and an over modulation method carried out in a high output voltage region other than the former two regions, and control is carried out by switching the modulation methods according to the output voltage region.

In JP-A-2010-206931 (paragraphs [0027] to [0036] and FIG. 1 to FIG. 3, etc.), a control method is disclosed in which a plurality of output voltage vectors suited for an output voltage command are selected with the use of instantaneous space vectors and the selected vectors are made to be outputted in the order for preventing common mode voltages, with suggestion of making the voltage vectors cause transition so as not to increase the number of switching operations more than that being necessary.

PATENT DOCUMENTS

[Patent Document 1] JP-A-2007-282484 (paragraphs [0008] to [0028] and FIG. 1 to FIG. 3, etc.)
[Patent Document 2] JP-A-2010-206931 (paragraphs [0027] to [0036] and FIG. 1 to FIG. 3, etc.)

In the related three-level inverter described in JP-A-2007-282484, modulation methods are switched to various ones such as the unipolar modulation method and the dipolar modulation method according to the levels of output voltages in their respective output voltage regions. In the unipolar modulation method, however, when the output voltage command is positive, switching operations alternately occur with respect to one switching element between the high voltage point at the voltage $E_d$ and the output terminal and one switching element between the middle voltage point at the voltage zero and the output terminal in the DC circuit for every one switching period. When the output voltage command is negative, switching operations alternately occur with respect to one switching element between the low voltage point at the voltage $-E_d$ and the output terminal and one switching element between the middle voltage point at the voltage zero and the output terminal in the DC circuit for every one switching period. That is, for each phase, the switching operations occur four times (the operation of one switching element changed from a turned-off state to a turned-on state and the operation of the switching element further returning from the turned-on state to the turned-off state are to be two times operations). Therefore, in three phases, the switching operations are to occur twelve times in total per one switching period.

While, in the dipolar modulation method, there is a problem in that the number of switching operations is to further increase in the low output voltage region to lower the efficiency of a system due to switching losses.

In addition, according to the related three-level inverter described in JP-A-2010-206931, the number of switching operations can be reduced by some orders of causing transitions of a plurality of output voltage vectors being selected. However, with the use of a counter (timer) such as a less expensive microcomputer, it is difficult to correctly manage the time ratio of each of voltage vectors, which requires a high expensive arithmetic unit with high performance to a possible increase in cost.

SUMMARY OF THE INVENTION

It is an object of the invention to provide a control method and a control system of a three-level inverter which are intended for downsizing and high efficiency with reduced losses by reducing the number of switching operations against the problem of the three-level inverter described in JP-A-2007-282484 and which enable cost reduction with the use of a counter such as a less expensive microcomputer against the problem of the three-level inverter described in JP-A-2010-206931.

For solving the foregoing problems, a first aspect of the invention is that in a control method of a three-level inverter wherein, with respect to a configuration in which three of three-level inverters are connected in parallel to each other, the three level inverter carrying out turning-on and -off of a plurality of semiconductor switching elements of at least one semiconductor switching element connected between a high voltage point of a DC circuit and one output terminal, at least one semiconductor switching element connected between a middle voltage point of the DC circuit and the output terminal, and at least one semiconductor switching element connected between a low voltage point of the DC circuit and the output terminal, and enabling any one of three level voltages of a DC high voltage, DC middle voltage and DC low voltage as the base of an AC voltage for one-phase to be outputted from the output terminal, the method makes a plurality of the semiconductor switching elements in each of the three three-level inverters turned-on and -off on the basis of output voltage commands of three-phase AC voltages to thereby make the three-phase AC voltage outputted, the method includes the steps of:

carrying out operations for obtaining on-time ratios of a plurality of the semiconductor switching elements in each of the three three-level inverters on the basis of the output voltage commands of the three-phase AC voltages;

dividing the one period of the output voltage command of the three-phase AC voltage into a plurality of sections; and in each of the sections, making the three-level inverter for one-phase alternately turn-on and -off the at least one semiconductor switching element connected between the high voltage point and the output terminal and the at least one semiconductor switching element connected between the middle voltage point and the output terminal with their respective operated on-time ratios in one switching period of the semiconductor switching element to alternately output the DC high voltage and the DC middle voltage;

along with this, making the three-level inverter for another one-phase fix the at least one switching element connected between the middle voltage point and the output terminal in a turned-on state to output the DC middle voltage; and along with this, further making the three-level inverter for the rest one-phase alternately turn-on and -off the at least one semiconductor switching element connected between the middle voltage point and the output terminal and the at least one semiconductor switching element connected between the low voltage point and the output terminal with their respective operated on-time ratios in the one switching period to alternately output the DC middle voltage and the DC low voltage.

A second aspect is that in the control method as the first aspect, the method includes the steps of:

in each of the sections, with respect to a phase with the value of the output voltage command being a maximum value, carrying out compensation of subtracting a middle value of the output voltage command in another phase from the maximum value to provide thus compensated value as the value of a maximum voltage command in the phase in the section;

with respect to the phase with the value of the output voltage command being the middle value, carrying out compensation of providing 0 as the value of a middle voltage command in the phase in the section;

with respect to the rest phase with the value of the output voltage command being a minimum value, carrying out compensation of subtracting the middle value of the output voltage command from the minimum value to provide thus compensated value as the value of a minimum voltage command in the phase in the section;

with respect to the phase with the value of the output voltage command being the minimum value, carrying out an operation of dividing the value of the maximum voltage command by the value of the DC high voltage to provide the on-time ratio of the at least one semiconductor switching element connected between the high voltage point and the output terminal in the three-level inverter in the phase and the on-time ratio of the at least one semiconductor switching element connected between the middle voltage point and the output terminal in the three-level inverter on the basis of the result of the division;

with respect to the phase with the value of the output voltage command being the middle value, carrying out an operation of providing 1 as the on-time ratio of fixing the at least one semiconductor switching element connected between the middle voltage point and the output terminal in the turned-on state in the three-level inverter in the phase on the basis of the value 0; and with respect to the phase with the value of the output voltage command being the minimum value, carrying out an operation of dividing the value of the minimum voltage command by the value of the DC low voltage to provide the on-time ratio of the at least one semiconductor switching element connected between the middle voltage point and the output terminal in the three-level inverter in the phase and the on-time ratio of the at least one semiconductor switching element connected between the minimum voltage point and the output terminal in the three-level inverter on the basis of the result of the division.

A third aspect is a control system for carrying out the control method of the first or second aspect which system includes:

a middle phase selecting means selecting, in each of the sections, an output voltage command of a phase with the value thereof being a middle value from the output voltage commands of the three-phase AC voltage;

a maximum, middle and minimum voltage command operating means classifying, in each of the sections, the output voltage commands of the three-phase AC voltage by value into a voltage command of a phase with the value thereof being a maximum value, the selected voltage command of the phase with the value thereof being the middle value and a voltage command of a phase with the value thereof being a minimum value, and carrying out the compensation of subtracting the selected middle value from each of the classified output voltage commands to output the compensated results as a maximum voltage command, a middle voltage command with zero value and a minimum voltage command;

an on-time ratio operating means carrying out, in each of the sections, an operation of dividing the value of the inputted maximum voltage command by the value of the DC high voltage to output the result of the operation as an operated value of the on-time ratio of the at least one semiconductor switching element connected between the high voltage point of the DC circuit and the one output terminal, carrying out an operation of converting the value 0 of the inputted middle voltage command into value 1 to output the value 1 as an operated value of the on-time ratio of fixing the at least one semiconductor switching element connected between the middle voltage point of the DC circuit and the one output terminal in the turned-on state, and carrying out an operation of dividing the value of the inputted minimum voltage command by the value of the DC low voltage to output the result of the operation as an operated value of the on-time ratio of the at least one semiconductor switching element connected between the low voltage point of the DC circuit and the one output terminal;

a by-phase on-time ratio operating means classifying by phase, in each of the sections, the operated values of the on-time ratios, which are classified by values, and outputting the operated values classified by phase as voltages with the values thereof corresponding to the on-time ratios; and a carrier comparing means making, in each of the sections, the voltages, inputted by phase with the values thereof corresponding to the on-time ratios, compared with a carrier, which converts the compared voltage into an on-off command with an on-time ratio corresponding to the compared voltage, to produce on-off commands with the on-time ratios by phase and provide the on-off commands as those for a plurality of the semiconductor switching elements in each of the three three-level inverters.

A fourth aspect is that in a control method of a three-level inverter wherein, with respect to a configuration in which three of three-level inverters are connected in parallel to each other, the three level inverter carrying out turning-on and -off of a plurality of semiconductor switching elements of at least one semiconductor switching element connected between a high voltage point of a DC circuit and one output terminal, at least one semiconductor switching element connected between a middle voltage point of the DC circuit and the output terminal, and at least one semiconductor switching element connected between a low voltage point of the DC circuit and the output terminal, and enabling any one of three level voltages of a DC high voltage, DC middle voltage and DC low voltage as the base of an AC voltage for one-phase to be outputted from the output terminal, the method makes a plurality of the semiconductor switching elements in each of the three three-level inverters turned-on and -off on the basis of output voltage commands of three-phase AC voltages to thereby make the three-phase AC voltage outputted, the method includes the steps of:

carrying out operations for obtaining on-time ratios of a plurality of the semiconductor switching elements in each of the three three-level inverters on the basis of the output voltage commands of the three-phase AC voltages;

dividing the one period of the output voltage command of the three-phase AC voltage into a plurality of sections; and in each of the sections, making the three-level inverter for one-phase fix one of the at least one semiconductor switching element connected between the high voltage point and the output terminal and the at least one semiconductor switching element connected between the low voltage point and the output terminal in a turned-on state to output one of the DC high voltage and the DC low voltage;

along with this, making the three-level inverter for another one-phase alternately turn-on and -off one of the at least one semiconductor switching element connected between the high voltage point and the output terminal and the at least one semiconductor switching element connected between the low voltage point and the output terminal with the at least one semiconductor switching element connected between the middle voltage point and the output terminal with their respective operated on-time ratios in one switching period of the semiconductor switching element to alternately output one of the DC high voltage and the DC low voltage with the DC middle voltage; and along with this, when making the three-level inverter for another one-phase output the DC high voltage, further making the three-level inverter for the rest one-phase alternately turn-on and -off the at least one semiconductor switching element connected between the low voltage point and the output terminal and the at least one semiconductor switching element connected between the middle voltage point and the output terminal with their respective operated on-time ratios in one switching period of the semiconductor switching element to alternately output the DC low voltage with the DC middle voltage; and when making the three-level inverter for another one-phase output the DC low voltage, further making the three-level inverter for the rest one-phase alternately turn-on and -off the at least one semiconductor switching element connected between the high voltage point and the output terminal and the at least one semiconductor switching element connected between the middle voltage point and the output terminal with their respective operated on-time ratios in one switching period of the semiconductor switching element to alternately output the DC high voltage with the DC middle voltage.

A fifth aspect is that in the control method as the fourth aspect, the method includes the steps of:

in each of the sections, when the output voltage command has the positive polarity and the absolute value of the maximum value, with respect to a phase with the output voltage command having the positive polarity and the absolute value of the maximum value, making the value of the DC high voltage as the maximum value of the compensated voltage command, providing the value of the DC high voltage as the maximum voltage command in the phase in the section, carrying out an operation of dividing the maximum voltage command by the value of the DC high voltage and, on the basis of the result of the division, providing 1 as the on-time ratio of fixing the at least one semiconductor switching element connected between the low voltage point and the output terminal in the turned-on state in the three-level inverter in the phase;

with respect to a phase with the value of the output voltage command being a middle value, carrying out compensation of adding the difference between the value of the DC high voltage and the maximum value of the output voltage command to the middle value of the voltage command, providing the value of the compensated voltage command as the value of the middle voltage command in the phase in the section, carrying out an operation of dividing the value of the middle voltage command by the value of the DC high voltage and, on the basis of the result of the division and the polarity of the middle voltage command, providing the on-time ratio of one of the at least one semiconductor switching element connected between the high voltage point and the output terminal in the three-level inverter in the phase and the at least one semiconductor switching element connected between the low voltage point and the output terminal in the inverter in the phase and the on-time ratio of the at least one semiconductor switching element connected between the middle voltage point and the output terminal in the inverter in the phase;

with respect to a phase with the value of the output voltage command being a minimum value, carrying out compensation of adding the difference between the value of the DC high voltage and the maximum value of the output voltage command to the minimum value of the voltage command, providing the value of the compensated voltage command as the value of the minimum voltage command in the phase in the section, carrying out an operation of dividing the value of the minimum voltage command by the value of the DC high voltage and, on the basis of the result of the division and the polarity of the minimum voltage command, providing the on-time ratio of one of the at least one semiconductor switching element connected between the high voltage point and the output terminal in the three-level inverter in the phase and the at least one semiconductor switching element connected between the high voltage point and the output terminal in the inverter in the phase and the on-time ratio of the at least one semiconductor switching element connected between the minimum voltage point and the output terminal in the inverter in the phase;

when the output voltage command has the negative polarity and the absolute value of the maximum value, with respect to a phase with the output voltage command having the negative polarity and the absolute value of the maximum value, making the absolute value of the DC low voltage as the maximum value of the compensated voltage command, providing the absolute value of the DC low voltage as the maximum voltage command in the phase in the section, carrying out an operation of dividing the absolute value of the maximum voltage command by the absolute value of the DC low voltage and, on the basis of the result of the division, providing 1 as the on-time ratio of fixing the at least one semiconductor switching element connected between the low voltage point and the output terminal in the turned-on state in the three-level inverter in the phase;

with respect to a phase with the value of the output voltage command being a middle value, carrying out compensation of subtracting the difference between the absolute value of the DC low voltage and the maximum value of the output voltage command from the middle value of the voltage command, providing the value of the compensated voltage command as the value of the middle voltage command in the phase in the section, carrying out an operation of dividing the value of the middle voltage command by the absolute value of the DC low voltage and, on the basis of the result of the division and the polarity of the middle voltage command, providing the on-time ratio of one of the at least one semiconductor switching element connected between the high voltage point and the output terminal in the three-level inverter in the phase and the at least one semiconductor switching element connected between the low voltage point and the output terminal in the inverter in the phase and the on-time ratio of the at least one semiconductor switching element connected between the middle voltage point and the output terminal in the inverter in the phase; and with respect to a phase with the value of the output voltage command being a minimum value, carrying out compensation of subtracting the difference between the absolute value of the DC low voltage and the maximum value of the output voltage command to the minimum value of the voltage command, providing the value of the compensated voltage command as the value of the minimum voltage command in the phase in the section, carrying out an operation of dividing the value of the minimum voltage command by the absolute value of the DC low voltage and, on the basis of the result of the division and the polarity of the middle voltage command, providing the on-time ratio of one of the at least one semiconductor switching element connected between the high voltage point and the output terminal in the three-level inverter in the phase and the at least one semiconductor switching element connected between the low voltage point and the output terminal in the inverter in the phase and the on-time ratio of the at least one semiconductor switching element connected between the minimum voltage point and the output terminal A sixth aspect is a control system for carrying out the control method of the fourth or fifth aspect which system includes:

an absolute maximum value command discriminating means detecting, in each of the sections, an output voltage command of a phase with an absolute value of the maximum value from the output voltage commands of the three-phase AC voltage and carrying out an operation for providing a compensation value for the output voltage commands on the basis of the maximum value and the polarity thereof;

a maximum, middle and minimum voltage command operating means classifying, in each of the sections, the output voltage commands of the three-phase AC voltage by value into a voltage command of a phase with the value thereof being a maximum value, a voltage command of the phase with the value thereof being the middle value and a voltage command of a phase with the value thereof being a minimum value, carrying out the compensation of adding the compensation value when the polarity of the maximum value is positive and subtracting the compensation value when the polarity of the maximum value is negative, and outputting the compensated results as a maximum voltage command with the value thereof being one of the value of the DC high voltage and the absolute value of the DC low voltage, a middle voltage command and a minimum voltage command;

an on-time ratio operating means carrying out, in each of the sections, an operation of dividing the value of the inputted maximum voltage command by the value of one of the value of the DC high voltage and the absolute value of the DC low voltage on the basis of the polarity of the maximum value to convert the value of the inputted maximum voltage command to 1 to output the result of the operation as an operated value of the on-time ratio of fixing the at least one semiconductor switching element connected between one of the high voltage point and the low voltage point and the one output terminal in the turned-on state, carrying out an operation of dividing the value of the inputted middle voltage command by one of the value of the DC high voltage and the absolute value of the DC low voltage on the basis of the polarity of the maximum value to output the result of the operation as an operated value of the on-time ratio of the at least one semiconductor switching element connected between one of the high voltage point and the low voltage point of the DC circuit and the one output terminal, and carrying out an operation of dividing the value of the inputted minimum voltage command by one of the value of the DC high voltage and the absolute value of the DC low voltage on the basis of the polarity of the maximum value to output the result of the operation as an operated value of the on-time ratio of the at least one semiconductor switching element connected between one of the high voltage point and the low voltage point of the DC circuit and the one output terminal;

a by-phase on-time ratio operating means classifying by phase, in each of the sections, the operated values of the on-time ratios, which are classified by values, and outputting the operated values classified by phase as voltages with the values thereof corresponding to the on-time ratios; and a carrier comparing means making, in each of the sections, the voltages, inputted by phase with the values thereof corresponding to the on-time ratios, compared with a carrier, which converts the compared voltage into an on-off command with an on-time ratio corresponding to the compared voltage, to produce on-off commands with the on-time ratios by phase and provide the on-off commands as those for a plurality of the semiconductor switching elements in each of the three three-level inverters.

A seventh aspect of the invention is a control method in which the method of the first or the second aspect is carried out when the amplitude of a three-phase output voltage command is equal to or less than a specified value and carried out as the method of the fourth or fifth aspect when the amplitude of the three-phase output voltage command is equal to or more than the specified value.

In addition an eighth aspect is that in the control system of the third aspect or the sixth aspect, the carrier is a triangular wave.

According to the first to sixth aspects of the invention, the number of switching operations can be reduced when compared with related art to make it possible to reduce losses and increase the efficiency of the system. In addition, on-off commands with specified on-time ratios can be produced with the use of a less expensive device such as a microcomputer to make it possible to provide a control system with reduced cost.

In particular, according to the fourth to sixth aspects and the eighth aspect, saturation in voltage commands and distortions in waveforms can be avoided to enable the range of an output voltage to be expanded.

Furthermore, according to the seventh aspect of the invention, by distinguishing between the control method in a low output voltage region and that in a high voltage region, output voltages can be controlled over a wide range.

BRIEF DESCRIPTION OF THE DRAWINGS

FIG. 4A is a waveform diagram showing the waveforms of the on-time ratios of U-, V-, and W-phases together with the waveform of a triangular wave according to the first embodiment;

FIG. 4B is a waveform diagram showing the waveforms of the on-off commands in the U-phase according to the first embodiment;

FIG. 4C is a waveform diagram showing the waveforms of the on-off commands in the V-phase according to the first embodiment;

FIG. 4D is a waveform diagram showing the waveforms of the on-off commands in the W-phase according to the first embodiment;

FIG. 8A is a waveform diagram showing the waveform of the voltage command $v_{u0}$ taken out from FIG. 7;

FIG. 8B is a waveform diagram showing the waveform of the voltage command $v_{v0}$ taken out from FIG. 7;

FIG. 8D is a waveform diagram showing the waveform of the zero-phase voltage command 3w taken out from FIG. 7;

FIG. 9A is a waveform diagram showing the waveforms of the on-time ratios of U-, V-, and W-phases together with the waveform of a triangular wave according to the second embodiment;

FIG. 9B is a waveform diagram showing the waveforms of the on-off commands in the U-phase according to the second embodiment;

FIG. 9D is a waveform diagram showing the waveforms of the on-off commands in the W-phase according to the second embodiment;

DESCRIPTION OF THE PREFERRED EMBODIMENT

In the following, embodiments of the invention will be explained with reference to the attached drawings.

Figure 1:
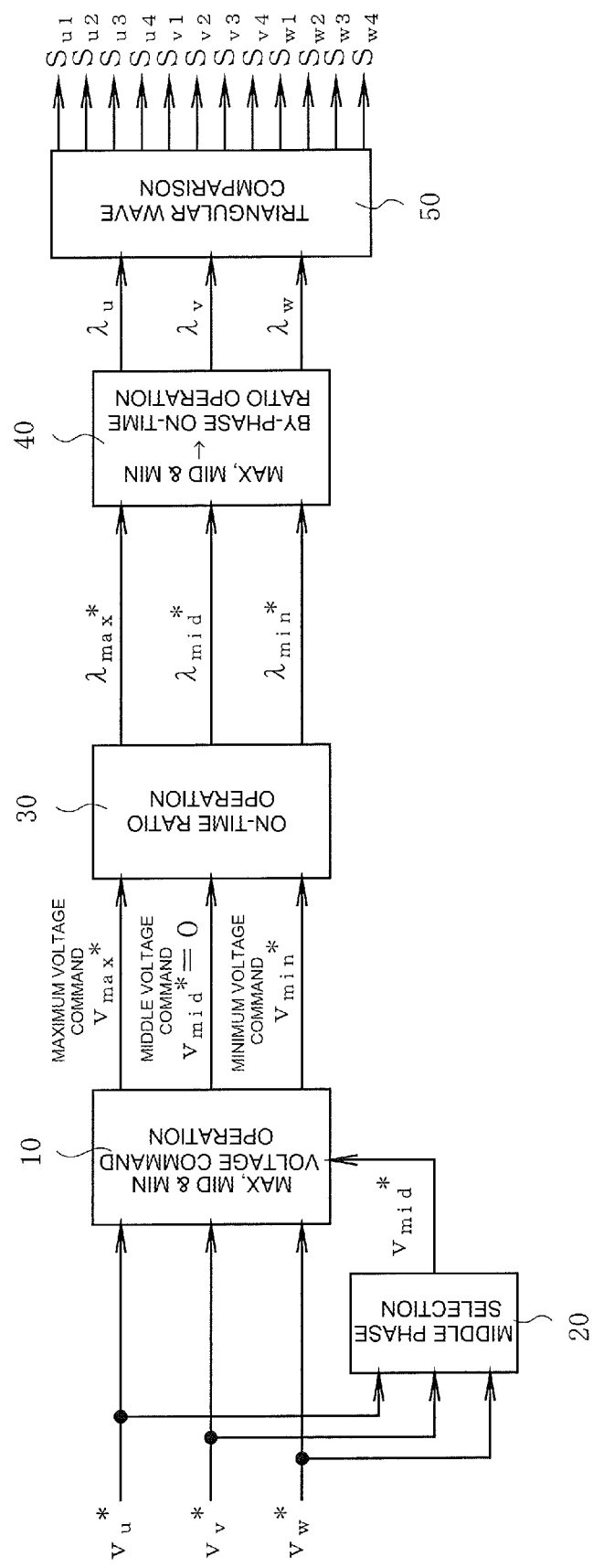
FIG. 1 is a functional block diagram showing a configuration of a control system according to a first embodiment of the invention.
Figure 13:
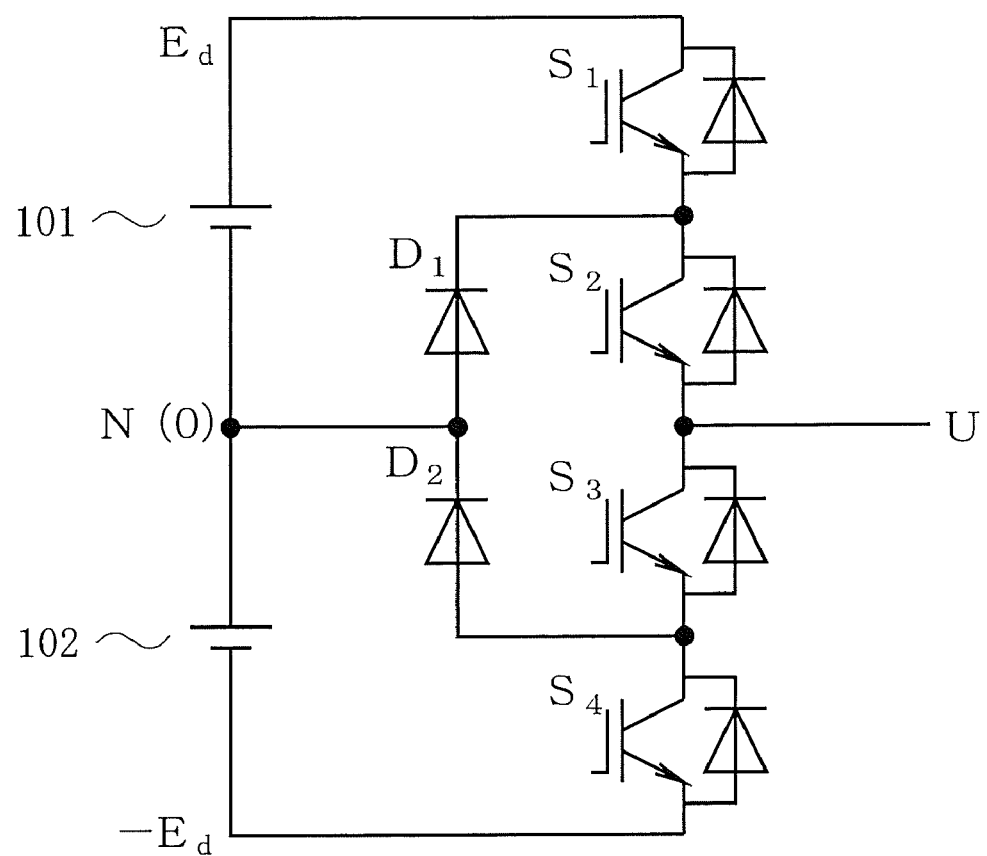
FIG. 13 is a circuit diagram showing the circuit configuration of an example of a common three-level inverter with respect to the circuit of one phase.

FIG. 1 is a functional block diagram showing a configuration of a control system according to a first embodiment (corresponding to the first to the third aspects) of the invention. The control system is formed with, for example, hardware and software of a microcomputer system. Here, the embodiment will be explained as a control system controlling the previously explained three-level inverter shown in FIG. 14. The embodiment, however, can be also applied to the control of the three-level inverter shown in FIG. 13.

Figure 2:
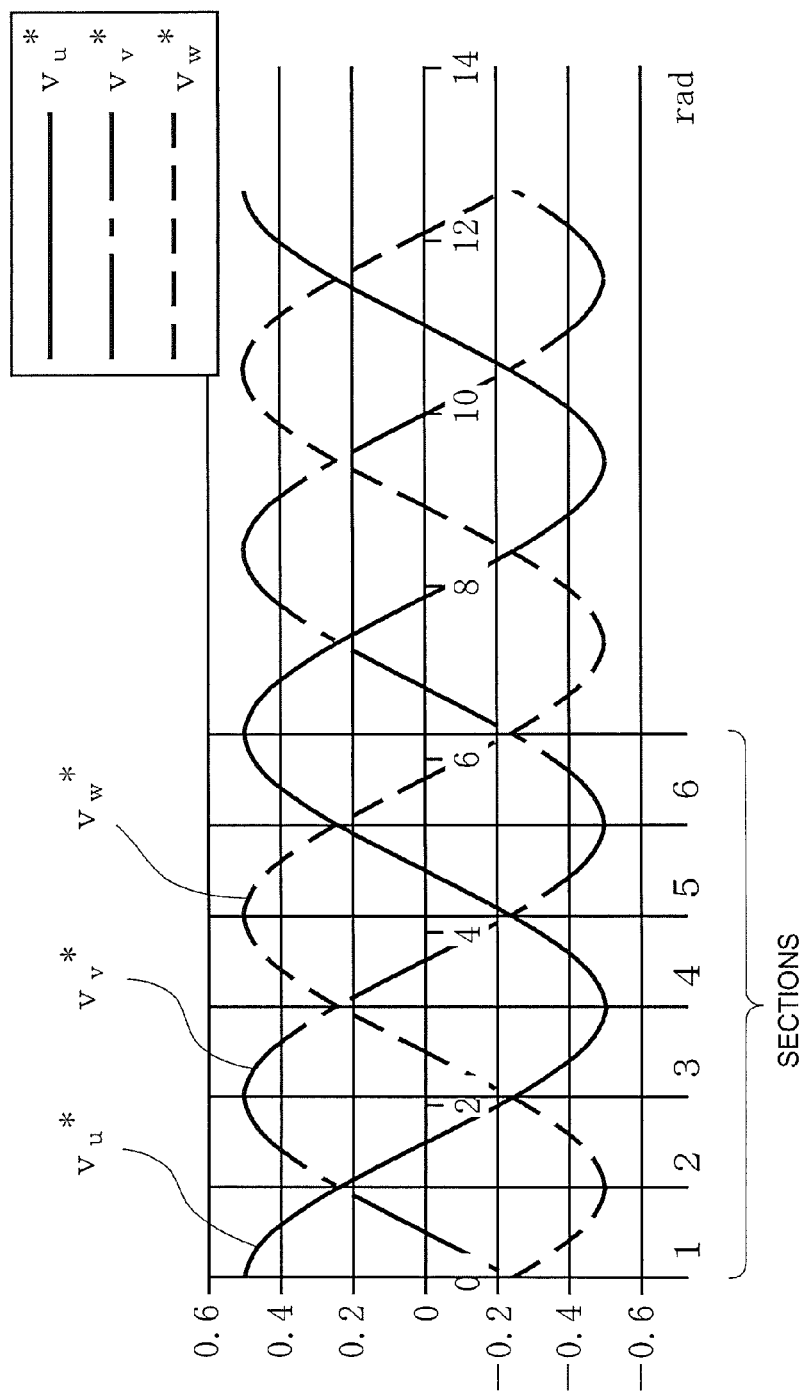
FIG. 2 is a waveform diagram showing the waveforms of three-phase output voltage commands $v_u^*$, $v_v^*$ and $v_w^*$ in the control system according to the first embodiment.

FIG. 2 is a waveform diagram showing the waveforms of three-phase output voltage commands $v_u^*$, $v_v^*$ and $v_w^*$ in the control system according to the first embodiment.

In FIG. 1, reference numeral 10 denotes a maximum, middle and minimum voltage command operating means. To the operating means 10, three-phase AC output voltage commands $v_u^*$, $v_v^*$ and $v_w^*$ as those shown in FIG. 2 are inputted which are obtained by operations performed on the basis of frequency commands, for example.

As is shown in FIG. 2, the one period of each of the voltage commands is divided into six, from the section 1 to the section 6, for example. In each section, a middle phase selecting means 20 shown in FIG. 1 selects a voltage command, the value of which is a middle value, as a middle voltage command $v_{mid}$ from the inputted voltage commands $v_u^*$, $v_v^*$ and $v_w^*$. Along with this, the maximum, middle and minimum voltage command operating means 10 classifies the voltage commands $v_u^*$, $v_v^*$ and $v_w^*$ in each section by value into maximum voltage commands $v_{max}$, middle voltage commands $v_{mid}$, and minimum voltage commands $v_{min}$ as those shown in a discrimination table given as Table 1.

TABLE 1

| SECTION | MAX. VOLTAGE COMMAND $v_{max}$ | MIDDLE VOLTAGE COMMAND $v_{mid}$ | MIN. VOLTAGE COMMAND $v_{min}$ |
|---|---|---|---|
| 1 | $v_u^*$ | $v_v^*$ | $v_w^*$ |
| 2 | $v_v^*$ | $v_u^*$ | $v_w^*$ |
| 3 | $v_v^*$ | $v_w^*$ | $v_u^*$ |
| 4 | $v_w^*$ | $v_v^*$ | $v_u^*$ |
| 5 | $v_w^*$ | $v_u^*$ | $v_v^*$ |
| 6 | $v_u^*$ | $v_w^*$ | $v_v^*$ |

With the sections determined as those shown in FIG. 2, as is apparent from Table 1 and FIG. 2, as the middle voltage command $v_{mid}$, the voltage commands $v_v^*$, $v_u^*$ and $v_w^*$ are to be arranged in their respective sections in the order of $v_v^* \rightarrow v_u^* \rightarrow v_w^*$ so that the order is repeated in cycles.

Here, the maximum, middle and minimum voltage command operating means 10 shown in FIG. 1 carries out compensation in which each of the maximum voltage command $v_{max}$, middle voltage command $v_{mid}$ and minimum voltage command $v_{min}$ in each of the sections shown in Table 1 has the middle voltage command $v_{mid}$ in the section subtracted therefrom as is expressed in the expressions (1) with the respective resulting outputs of a maximum voltage command $v_{max}^*$, middle voltage command $v_{mid}^*$ and minimum voltage command $v_{min}^*$. The compensation is carried out so that the compensated middle voltage command $v_{mid}^*$ always becomes as $v_{mid}^*=0$:

$$\left.\begin{aligned} v_{max}^* &= v_{max} - v_{mid} \\ v_{mid}^* &= v_{mid} - v_{mid} = 0 \\ v_{min}^* &= v_{min} - v_{mid} \end{aligned}\right\} \quad (1)$$

Figure 3:
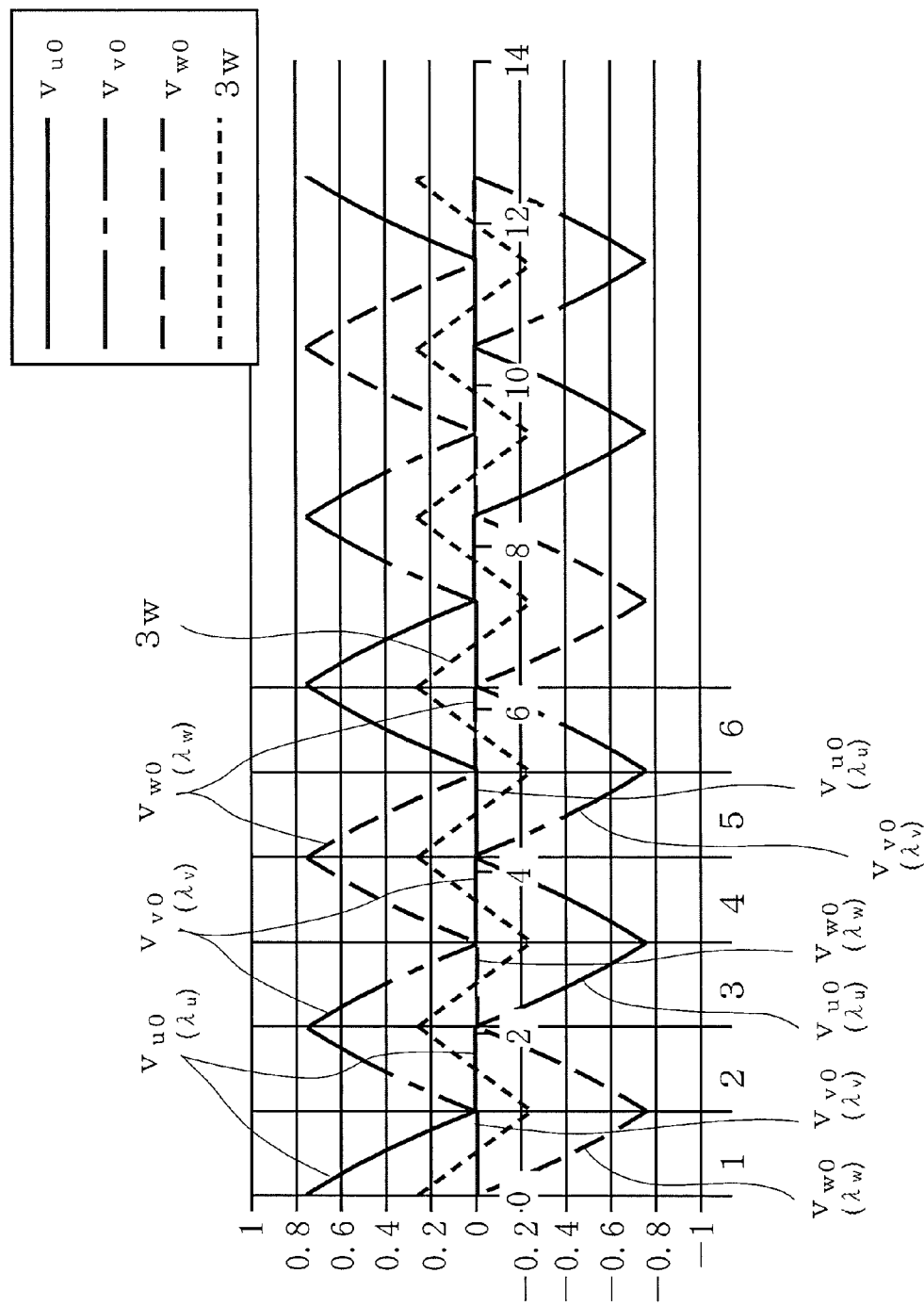
FIG. 3 is a waveform diagram showing the waveforms of voltage commands $v_u^*$, $v_v^*$ and $v_w^*$ after the output voltage commands $v_u^*$, $v_v^*$ and $v_w^*$ shown in FIG. 2 are compensated, respectively, together with the waveform of a zero-phase voltage command 3w in the first embodiment.

FIG. 3 is a waveform diagram showing the waveforms of voltage commands $v_{u0}$, $v_{v0}$ and $v_{w0}$ after the output voltage commands $v_u^*$, $v_v^*$ and $v_w^*$ shown in FIG. 2 are compensated according to the expressions (1).

For example, in the section 1, the maximum voltage command $v_{max}$, middle voltage command $v_{mid}$ and minimum voltage command $v_{min}$ before being compensated by the expressions (1) are the output voltage command $v_u^*$ in the U-phase, the output voltage command $v_v^*$ in the V-phase and the output voltage command $v_w^*$ in the W-phase, respectively, which are shown in FIG. 2. Thus, in correspondence with this, after the compensation, the maximum voltage command $v_{max}^*$ is designated as $v_{u0}$ in the U-phase, the middle voltage command $v_{mid}^*$ (=0) is designated as $v_{v0}$ in the V-phase, and the minimum voltage command $v_{min}^*$ is designated as $v_{w0}$ in the W-phase.

As is expressed by the foregoing expression (1), the maximum voltage command $v_{max}^*$ is given as $v_{max}^*=v_{max}-v_{mid}$. Then, the voltage command $v_{u0}$ as the maximum voltage command $v_{max}^*$ becomes $v_u^*-v_v^*$, the difference between the output voltage command $v_u^*$ with the maximum voltage and the output voltage command $v_v^*$ with the middle voltage in the section 1 shown in FIG. 2. Moreover, by the expression (1), the middle voltage command $v_{mid}^*$ is given as $v_{mid}^*=0$. Then, the voltage command $v_{v0}$ as the middle voltage command $v_{mid}^*$ becomes zero in the section 1. In addition, by the expression (1), the minimum voltage command $v_{min}^*$ is given as $v_{min}^*=v_{min}-v_{mid}$. Then, the voltage command $v_{w0}$ as the minimum voltage command $v_{min}^*$ becomes $v_w^*-v_v^*$, the difference between the output voltage command $v_w^*$ with the minimum voltage and the output voltage command $v_v^*$ with the middle voltage in the section 1.

In the section 2, as is shown in FIG. 2, the maximum voltage command $v_{max}$, middle voltage command $v_{mid}$ and minimum voltage command $v_{min}$ before being compensated by the expressions (1) are the output voltage commands $v_v^*$, $v_u^*$ and $v_w^*$, respectively. Then, the voltage command $v_{u0}$ is outputted as the maximum voltage command $v_{max}^*$, the voltage command $v_{u0}$ is outputted as the voltage command $v_{mid}^*$ (=0) and the voltage command $v_{w0}$ is outputted as the minimum voltage command $v_{min}^*$. Similarly in the following, also with respect to each of the sections 3 to 6, as each of the voltage commands $v_{max}^*$, $v_{mid}^*$ and $v_{min}^*$ after being compensated, any one of $v_{u0}$, $v_{v0}$ and $v_{w0}$ is to be outputted.

In FIG. 3, in addition to the compensated voltage commands $v_{u0}$, $v_{v0}$ and $v_{w0}$ in their respective phases, a compensated zero-phase voltage command 3w is also shown. The zero-phase voltage command 3w is a command derived by carrying out the compensation of subtracting the middle voltage command $v_{mid}$ from the zero-phase voltage with the value zero in the same way as is expressed in the expressions (1) with respect to each section in FIG. 2. However, since the zero-phase voltage is the reference voltage for a voltage in each phase, then, in a line-to-line voltage as a difference between a voltage in a certain phase and a voltage in another phase, the zero-phase voltages with respect to their respective voltages cancel out each other. Therefore, in each of the voltage commands $v_{u0}$, $v_{v0}$ and $v_{w0}$ which is provided as the difference between the voltage command in a certain phase and the voltage command in another phase as is expressed in the expressions (1), the zero-phase voltage commands 3w cancel out each other. Thus, the control of an output voltage according to each of the voltage commands $v_{u0}$, $v_{v0}$ and $v_{w0}$ will be unaffected by the zero-phase voltage command 3w.

Return to FIG. 1. To an on-time ratio operating means 30, the maximum voltage command $v_{max}^*$, middle voltage command $v_{mid}^*(=0)$ and minimum voltage command $v_{min}^*$ in each section are inputted which are those after being compensated. The on-time ratio operating means 30 carries out operations by the following expressions (2) with the values of the maximum voltage command $v_{max}^*$ and minimum voltage command $v_{min}^*$ of the voltage commands and the values of the DC voltages Ed (DC high voltage) and −Ed (DC low voltage) in the DC circuit of the inverter to obtain on-time ratios $\lambda_{max}^*$ and $\lambda_{min}^*$. The on-time ratio $\lambda_{max}^*$ is the ratio of a time, during which the switching element $S_1$ in the DC circuit in the inverter is turned-on for providing an output corresponding to the maximum voltage command $v_{max}^*$, to one switching period in the switching operation of converting the DC voltages to an AC voltage. While, the on-time ratio $\lambda_{min}^*$ is the ratio of a time, during which the switching element $S_4$ in the DC circuit in the inverter is turned-on for providing an output corresponding to the minimum voltage command $v_{min}^*$, to one switching period in the foregoing switching operation of the conversion:

$$\left.\begin{array}{l}\lambda_{max}^* = v_{max}^*/E_d \\ \lambda_{min}^* = v_{min}^*/(-E_d)\end{array}\right\} \quad (2)$$

where each of $\lambda_{max}^*$ and $\lambda_{min}^*$ has a value between 1 and 0.

As is apparent from the expressions (2), the on-time ratios $\lambda_{max}^*$ and $\lambda_{min}^*$ are proportional to the voltage commands $v_{max}^*$ and $v_{min}^*$, respectively. Here, the value of $\lambda_{min}^*$ is provided as a positive one.

The on-time ratio $\lambda_{mid}^*$ with respect to the middle voltage command $v_{mid}^*$ with the value thereof being zero is similarly provided as $\lambda_{min}^*=0$.

Here, consider the on-time ratio in the one switching period of each of switching elements in each phase.

Figure 14:
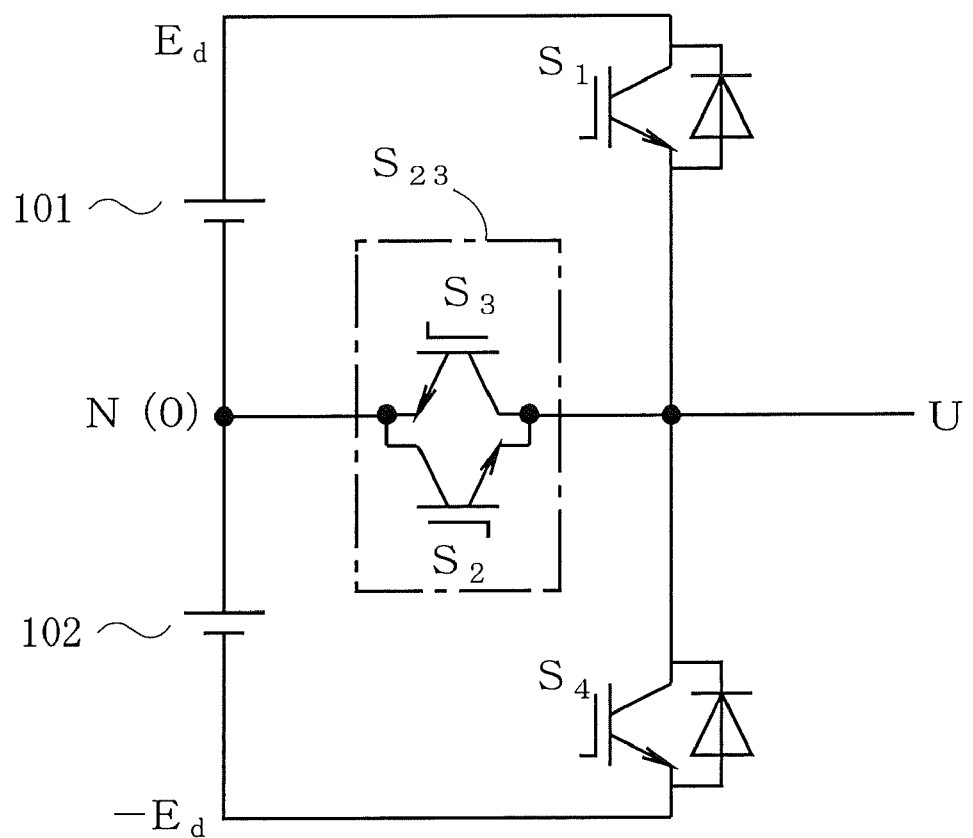
FIG. 14 is a circuit diagram showing the circuit configuration of another example of a common three-level inverter with respect to the circuit of one phase.

In the section 1, the maximum voltage command $v_{max}$ is the voltage command $v_u^*$ in the U-phase. Then, the maximum voltage command $v_{max}^*$ after being compensated is the voltage command $v_{u0}$. Therefore, the on-time ratio of the switching element $S_1$, which outputs the maximum voltage Ed in the DC circuit with respect to the U-phase in the three-level inverter shown in FIG. 14, is provided as $\lambda_{max}^*$. While, the switching element $S_3$ in the circuit is made to be turned-off while the switching element $S_1$ is turned-on and is made to be turned-on while the switching element $S_1$ is turned-off to output a voltage zero. Therefore, the on-time ratio thereof is provided as 1-$\lambda_{max}^*$. Furthermore, the switching element $S_2$, causing no short circuit in the DC power supply 102 even though it is turned-on, is made to be turned-on through the one switching period to be brought into a free-wheeling mode. The switching element $S_4$, since the DC circuit with respect to the U-phase outputs no minimum voltage −Ed in the section 1, is made to be turned-off through the one switching period.

From the foregoing, the respective on-time ratios $\lambda_{maxS1}$ to $\lambda_{maxS4}$ of the switching elements $S_1$ to $S_4$ for the maximum voltage command $v_{max}^*$ are expressed as the expressions (3):

$$\left.\begin{array}{l}\lambda_{maxS1} = \lambda_{max}^* \\ \lambda_{maxS2} = 1 \\ \lambda_{maxS3} = -\lambda_{max}^* \\ \lambda_{maxS4} = 0\end{array}\right\} \quad (3)$$

Next, in the section 1, the voltage command $v_v^*$ in the V-phase has a middle value. Then, the compensated middle voltage command $v_{mid}^*$ having the value of zero becomes the voltage command $v_{v0}$ in the V-phase. Therefore, in the DC circuit in the V-phase, on the basis of the on-time ratio $\lambda_{mid}^*(=0)$ for outputting the voltage zero, on-time ratios $\lambda_{midS1}$ to $\lambda_{midS4}$ of the switching elements $S_1$ to $S_4$, respectively, are provided as those expressed in the expressions (4). This makes the switching elements $S_2$ and $S_3$ turned-on and the switching elements $S_1$ and $S_4$ turned-off through the one switching period:

$$\left.\begin{array}{l}\lambda_{midS1} = 0 \\ \lambda_{midS2} = 1 \\ \lambda_{midS3} = 1 \\ \lambda_{midS4} = 0\end{array}\right\} \quad (4)$$

As is apparent from the expressions (4), for outputting the voltage zero according to the middle voltage command, each of the switching element $S_2$ and $S_3$ is fixed in a turned-on state and each of the switching element $S_1$ and $S_4$ is fixed in a turned-off state without carrying out switching operation in the one switching period.

Furthermore, in the section 1, the minimum voltage command $v_{min}$ is the voltage command $v_w^*$ in the W-phase. Then, the minimum voltage command $v_{min}^*$ after being compensated is the voltage command $v_{w0}$. Therefore, the on-time ratio of the switching element $S_4$, which outputs the minimum voltage −Ed in the DC circuit with respect to the W-phase, equivalent to the DC circuit with respect to the U-phase in the three-level inverter shown in FIG. 14, is provided as $\lambda_{min}^*$. While, the switching element $S_2$ in the circuit is made to be turned-off while the switching element $S_4$ is turned-on and is made to be turned-on while the switching element $S_4$ is turned-off to output a voltage zero. Therefore, the on-time ratio thereof is provided as 1-$\lambda_{min}^*$. Furthermore, the switching element $S_3$, causing no short circuit in the DC power supply 101 even though it is turned-on, is made to be turned-on through the one switching period to be brought into a free-wheeling mode. The switching element $S_1$, since the DC circuit with respect to the W-phase outputs no maximum voltage Ed in the section 1, is made to be turned-off through the one switching period.

From the foregoing, the respective on-time ratios $\lambda_{minS1}$ to $\lambda_{minS4}$ of the switching elements $S_1$ to $S_4$ for the minimum voltage command $v_{min}*$ are expressed as the expressions (5):

$$\left.\begin{array}{l} \lambda_{minS1} = 0 \\ \lambda_{minS2} = 1 - \lambda_{min}^* \\ \lambda_{minS3} = 1 \\ \lambda_{minS4} = \lambda_{min}^*. \end{array}\right\} \quad (5)$$

The on-time ratio operating means 30 shown in FIG. 1 outputs the on-time ratios $\lambda_{max}*$, $\lambda_{mid}*$ and $\lambda_{min}*$ obtained from the inputted maximum voltage command $v_{max}*$, middle voltage command $v_{mid}*(=0)$ and minimum voltage command $v_{min}*$, respectively, inputted in each section.

A by-phase on-time ratio operating means 40 converts the on-time ratios $\lambda_{max}*$, $\lambda_{mid}*$ and $\lambda_{min}*$ in each of the foregoing sections, which ratios are inputted to the means 40 while being classified by value, into on-time ratios $\lambda_u$, $\lambda_v$ and $\lambda_w$ classified by phase of the U, V and W. As was explained in the foregoing, the on-time ratios $\lambda_{max}*$ and $\lambda_{min}*$ are proportional to the maximum voltage command $v_{max}*$ and $v_{min}*$, respectively, and the value of the on-time ratio $\lambda_{mid}*$ is zero in correspondence with the value of the middle voltage command $v_{mid}*$ being zero. Therefore, the waveforms of the on-time ratios $\lambda_u$, $\lambda_v$ and $\lambda_w$ are geometrically similar to the waveforms of the voltage commands $v_{u0}$, $v_{v0}$ and $v_{w0}$ shown in FIG. 3, respectively. However, the on-time ratios corresponding to the negative voltage commands become positive.

A triangular wave comparing means 50 as a carrier comparison means compares the waveforms of the on-time ratios $\lambda_u$, $\lambda_v$ and $\lambda_w$ in their respective U-, V- and W-phases with a triangular wave as a carrier to obtain on-off commands for the switching elements in the DC circuit of the inverter in each of the U-, V- and W-phases from the result of the comparison and outputs the obtained commands. In FIG. 1, signs $S_{u1}$ to $S_{w4}$ designate on-off commands outputted from the triangular wave comparing means 50. Of the on-off commands $S_{u1}$ to $S_{w4}$, the on-off commands $S_{u1}$ to $S_{u4}$ are the on-off commands to four switching elements (corresponding to the switching elements $S_1$ to $S_4$ shown in FIG. 14) in the DC circuit in the U-phase, the on-off commands $S_{v1}$ to $S_{v4}$ are the on-off commands to four switching elements in the DC circuit in the V-phase not shown, and the on-off commands $S_{w1}$ to $S_{w4}$ are the on-off commands to four switching elements in the DC circuit in the W-phase not shown.

FIGS. 4A-4D are waveform diagrams showing the operation of the triangular wave comparing means 50 according to the first embodiment in a part of the section 1, with FIG. 4A showing the waveforms of the on-time ratios $\lambda_u$, $\lambda_v$, $\lambda_w$ in the U-, V- and W-phases, respectively, together with the waveform of the triangular wave as a carrier, FIG. 4B showing the waveforms of the on-off commands $S_{u1}$ to $S_{u4}$ to the switching elements in the inverter in the U-phase, FIG. 4C showing the waveforms of the on-off commands $S_{v1}$ to $S_{v4}$ to the switching elements in the inverter in the V-phase, and FIG. 4D showing the waveforms of the on-off commands $S_{w1}$ to $S_{w4}$ to the switching elements in the inverter in the W-phase. That is, FIGS. 4B-4D show the turned-on and -off states of the switching elements in the U-, V- and W-phases, respectively. Here, "a part of the section 1" is the part from 0.3 to 0.32 in the section 1 when letting the length (time length) of the section 1 shown in FIG. 2 and FIG. 3 be unity. In the following explanations, the reference signs of the on-off commands $S_{u1}$ to $S_{u4}$, $S_{v1}$ to $S_{v4}$ and $S_w$ to $S_{w4}$ are to be also used as the reference signs of the switching elements.

By using an up-down counter contained in a device such as a microcomputer, a carrier of a triangular wave is formed which moves between 0 and 1 as is shown in FIG. 4A. The time length from the time at which the carrier initiates an increase from zero to the time at which the carrier returns to zero again after reaching 1 and then turning back therefrom becomes the one switching period.

The triangular wave comparing means 50 shown in FIG. 1 is formed by using a comparator contained in a device such as a microcomputer, with which means the values of the on-time ratios $\lambda_u$, $\lambda_v$ and $\lambda_w$, corresponding to the values of the waveforms of the voltage commands $v_{u0}$, $v_{v0}$, $v_{w0}$ in the U-, V- and W-phases shown in FIG. 3, respectively, are compared with the value of the triangular wave as a carrier as is shown in FIG. 4A. The period of the triangular wave is equivalent to the one switching period of the switching element.

In the part of the section 1 shown in FIG. 4A, the on-time ratios $\lambda_u$, $\lambda_v$ and $\lambda_w$ are shown as the on-time ratio $\lambda_{max}*$ corresponding to the voltage command $v_{u0}$ as the maximum voltage command $v_{max}*$, the on-time ratio $\lambda_{mid}*$ corresponding to the voltage command $v_{v0}$ as the middle voltage command $\lambda_{mid}*$ and the on-time ratio $\lambda_{min}*$ corresponding to the voltage command $v_{w0}$ as the minimum voltage command $\lambda_{min}*$, respectively. Here, however, the on-time ratio $\lambda_w$, shown as the on-time ratio $\lambda_{min}*$ corresponding to the voltage command $v_{w0}$ as the negative minimum voltage command $\lambda_{min}*$, is shown as being positive according to the expressions (2).

By the comparison between the value of the on-time ratio and the value of the carrier as the triangular wave, the time during which the value of the on-time ratio is equal to or more than the value of the triangular wave in the period of the triangular wave, i.e. the one switching period of a switching element, is determined as the time during which the switching element is made turned-on with the on-time ratio by an on-off command.

This can be explained by considering a triangle with the vertex thereof put on the horizontal axis in FIG. 4A. The triangle is formed by the triangular wave and a straight line intersecting the triangular wave and representing, for example, the on-time ratio $\lambda_u$ in the U-phase as the on-time ratio $\lambda_{max}*$. The triangle is one with the straight line that represents the on-time ratio $\lambda_u(\lambda_{max}*)$ forming a base and the on-time ratio $\lambda_u(\lambda_{max}*)$ therefore being the height thereof. Since the length of a base of a triangle is proportional to the height to the vertex opposite to the base, the ratio of the time, during which the value of the on-time ratio $\lambda_u(\lambda_{max}*)$ is equal to or more than the value of the carrier, to the one switching period is the on-time ratio $\lambda_{max}*$. The time in the rest of the one period of the carrier, during which the value of the on-time ratio $\lambda_u(\lambda_{max}*)$ is less than the value of the carrier, is proportional to the on-time ratio $1-\lambda_{max}*$.

The same is true for the on-time ratio $\lambda_w$ in the W-phase shown as the on-time ratio $\lambda_{min}*$.

The on-time ratio $\lambda_v$ in the V-phase shown as the on-time ratio $\lambda_{mid}*(=0)$ is 0 on the basis of the same consideration as that in the foregoing.

In this way, by using one carrier signal of a triangular wave, on-off commands, each having a determined on-time ratio, are formed with respect to each of the phases as is shown in FIGS. 4B-4D.

In the section 1, as was explained in the foregoing, the voltage command $v_{u0}$ in the U-phase is the maximum voltage command $v_{max}*$. Therefore, in FIG. 4B, waveforms of the on-off commands $S_{u1}$ to $S_{u4}$, which are for carrying out switching of the switching elements $S_{u1}$ to $S_{u4}$ in the U-phase with the on-time ratios $\lambda_{maxS1}$ to $\lambda_{maxS4}$, respectively, being provided by the expressions (3), are shown in the part of the section 1.

At the beginning of the one switching period, the value of the on-off command $S_{u1}$ becomes 1 from 0 with the on-time ratio $\lambda_{maxS1}$ provided as $\lambda_{max}*$ as the on-time ratio $\lambda_u$ by the expressions (3). Simultaneously with this, the value of the on-off command $S_{u3}$ becomes 0 from 1.

Thereafter, the value of the on-off commands $S_{u1}$ becomes 0. Simultaneously with this, the on-off commands $S_{u3}$ becomes to have the value of 1 with the on-time ratio $\lambda_{maxS3}$ provided as $1-\lambda_{max}*$ by the expressions (3) and becomes to have the value 0 again at the end of the one switching period, i.e. at the beginning of the next one switching period. Simultaneously with this, the value of the on-off command $S_{u1}$ becomes 1 again from 0.

This makes each of the switching elements $S_{u1}$ and $S_{u3}$ carry out two times of switching, four times in total of both, in the one switching period (the switching elements $S_{u1}$ is made to be turned-on, then turned-off and then turned-on and the switching element $S_{u3}$ is made to be turned-off, then turned-on and then turned-off).

Compared with this, the on-time ratio $\lambda_{maxS2}$ of the on-off command $S_{u2}$ is left at 1 according to the expression $\lambda_{maxS2}=1$ provided by the expressions (3) and the on-time ratio $\lambda_{maxS4}$ of the on-off command $S_{u4}$ is left at 0 according to the expression $\lambda_{maxS4}=0$ provided by the expressions (3). That is, the switching elements $S_{u2}$ and $S_{u4}$ carry out no switching (turning-on and -off).

Moreover, in the section 1, as was explained in the foregoing, the voltage command $v_{v0}$ in the V-phase is the middle voltage command $v_{mid}*(=0)$. In correspondence with this, the on-time ratio $\lambda_v$ of the on-off command is the on-time ratio $\lambda_{mid}*(=0)$. On the basis of this, in FIG. 4C, waveforms of the on-off commands $S_{v1}$ to $S_{v4}$, which are for carrying out switching of the switching elements $S_{v1}$ to $S_{v4}$ in the V-phase with the on-time ratios $\lambda_{midS1}$ to $\lambda_{midS4}$, respectively, being provided by the expressions (4), are shown in the part of the section 1.

Namely, the on-time ratios $\lambda_{midS2}$ and $\lambda_{midS3}$ of the on-off commands $S_{v2}$ and $S_{v3}$ are left at 1 according to the expressions $\lambda_{midS2}=1$ and $\lambda_{midS3}=1$, respectively, which are provided by the expressions (4) and the on-time ratios $\lambda_{midS1}$ and $\lambda_{midS4}$ of the on-off commands $S_{v1}$ and $S_{v4}$ are left at 0 according to the expressions $\lambda_{midS1}=0$ and $\lambda_{midS4}=0$, respectively, which are provided by the expressions (4). This makes the switching elements $S_{v2}$ and $S_{v3}$ left turned-on and the switching elements $S_{v1}$ and $S_{v4}$ left turned-off. In this way, in the v-phase, all of the switching elements $S_{v1}$ to $S_{v4}$ carry out no switching (turning-on and -off) with the number of switching in the one switching period being zero.

Moreover, in the section 1, as was explained in the foregoing, the voltage command $v_{v0}$ in the V-phase is the middle voltage command $v_{mid}*(=0)$. In correspondence with this, the on-time ratio $\lambda_v$ of the on-off command is the on-time ratio $\lambda_{mid}*(=0)$. On the basis of this, in FIG. 4C, waveforms of the on-off commands $S_{v1}$ to $S_{v4}$, which are for carrying out switching of the switching elements $S_{v1}$ to $S_{v4}$ in the V-phase with the on-time ratios $\lambda_{midS1}$ to $\lambda_{midS4}$, respectively, being provided by the expressions (4), are shown in the part of the section 1.

Namely, the on-time ratios $\lambda_{midS2}$ and $\lambda_{midS3}$ of the on-off commands $S_{v2}$ and $S_{v3}$ are left at 1 according to the expressions $\lambda_{midS2}=1$ and $\lambda_{midS3}=1$, respectively, which are provided by the expressions (4) and the on-time ratios $\lambda_{midS1}$ and $\lambda_{midS4}$ of the on-off commands $S_{v1}$ and $S_{v4}$ are left at 0 according to the expressions $\lambda_{midS1}=0$ and $\lambda_{midS4}=0$, respectively, which are provided by the expressions (4). This makes the switching elements $S_{w2}$ and $S_{w3}$ left turned-on and the switching elements $S_{v1}$ and $S_{v4}$ left turned-off. In this way, in the v-phase, all of the switching elements $S_{v1}$ to $S_{v4}$ carry out no switching (turning-on and -off) with the number of switching in the one switching period being zero.

Here, in FIG. 4C, the waveforms (characteristic lines) of the on-off commands $S_{v3}$ and $S_{v2}$ to their respective switching elements $S_{v3}$ and $S_{v2}$ coincide with each other and the waveforms (characteristic lines) of the on-off commands $S_{v4}$ and $S_{v1}$ to their respective switching elements $S_{v4}$ and $S_{v1}$ coincide with each other. Thus, the characteristic lines are shown as those for the switching elements $S_{v3}$ and $S_{v4}$ only.

Furthermore, in the section 1, as was explained in the foregoing, the voltage command $v_{w0}$ in the W-phase is the minimum voltage command $v_{min}*$. Therefore, in FIG. 4D, waveforms of the on-off commands $S_{w1}$ to $S_{w4}$, which are for carrying out switching of the switching elements $S_{w1}$ to $S_{w4}$ in the W-phase with the on-time ratios $\lambda_{minS1}$ to $\lambda_{minS4}$, respectively, being provided by the expressions (5), are shown in the part of the section 1.

At the beginning of the one switching period, the value of the on-off command $S_{w4}$ becomes 1 from 0 with the on-time ratio $\lambda_{minS4}$ provided as $\lambda_{min}*$ as the on-time ratio $\lambda_W$ by the expressions (5). Simultaneously with this, the value of the on-off command $S_{w2}$ becomes 0 from 1.

Thereafter, the value of the on-off commands $S_{w4}$ becomes 0. Simultaneously with this, the on-off commands $S_{w2}$ becomes to have the value of 1 with the on-time ratio $\lambda_{minS2}$ provided as $1-\lambda_{min}*$ by the expressions (5) and becomes to have the value 0 again at the end of the one switching period, i.e. at the beginning of the next one switching period. Simultaneously with this, the value of the on-off command $S_{w2}$ becomes 1 again from 0.

This makes each of the switching elements $S_{w2}$ and $S_{w4}$ carry out two times of switching, four times in total of both, in the one switching period like the switching elements $S_{u1}$ and $S_{u3}$ in the U-phase.

Compared with this, the on-time ratio $\lambda_{minS1}$ of the on-off command $S_{w1}$ is left at 0 according to the expression $\lambda_{minS1}=0$ provided by the expressions (5) and the on-time ratio $\lambda_{minS3}$ of the on-off command $S_{w3}$ is left at 1 according to the expression $\lambda_{minS3}=1$ provided by the expressions (5). That is, the switching elements $S_{w1}$ and $S_{w3}$ carry out no switching (turning-on and -off).

By the switching operation like in the foregoing, a train of rectangular waves each with an on-time ratio changing with time, that is, a train of rectangular waves each with a width proportional to the value of the compensated voltage command changing with time, are formed with respect to each of three phases of the U-, V- and W-phases. The train of the rectangular waves are subjected to known demodulating processing to be converted into a three-level AC voltage.

As is explained in the foregoing, according to the first embodiment, the three-level inverter can be controlled by carrying out switching of eight times per switching period.

Moreover, the carrier of the triangular wave, which is used for outputting the on-off commands in the U- V- and W-phases with the predetermined on-time ratios $\lambda_u$, $\lambda_v$ and $\lambda_w$, respectively, in each section, can be produced by an up-down counter contained in a device such as a common microcomputer. This requires no high performance and high expensive operation device to make it possible to avoid an increase in cost.

In the foregoing inverter according to the first embodiment, it is possible to reduce switching losses by reducing the number of times of switching and, along with this, to lower the cost of the control system with the use of an inexpensive device such as a microcomputer.

The control system according to the first embodiment, however, has the following problem. Namely, the voltage command after being compensated and shown in FIG. 3 has an amplitude (±0.75 in the embodiment) larger than the amplitude (±0.5 in the embodiment) of the voltage command shown in FIG. 2 which is inputted to the control system. Therefore, when the amplitude of the inputted voltage command becomes large, the value of the maximum voltage command $v_{max}^*$ after being compensated and the absolute value of the minimum voltage command $v_{min}^*$ after being compensated are sometimes calculated as being larger than the absolute value $E_d$ of the power supply voltage to cause the values of the on-time ratios $\lambda_{max}^*$ and $\lambda_{min}^*$ to exceed 1. Since this is not permitted, the values of the on-time ratios $\lambda_{max}^*$ and $\lambda_{min}^*$ are restricted to 1. This results in saturation in the inverted output voltages to make it impossible to output correct voltages according to commands to thereby restrict the values of voltages that can be normally outputted.

Accordingly, in the following second embodiment, a control system is actualized in which the range of the voltage that can be normally outputted is expanded with the number of times of switching equal to that in the first embodiment.

Figure 5:
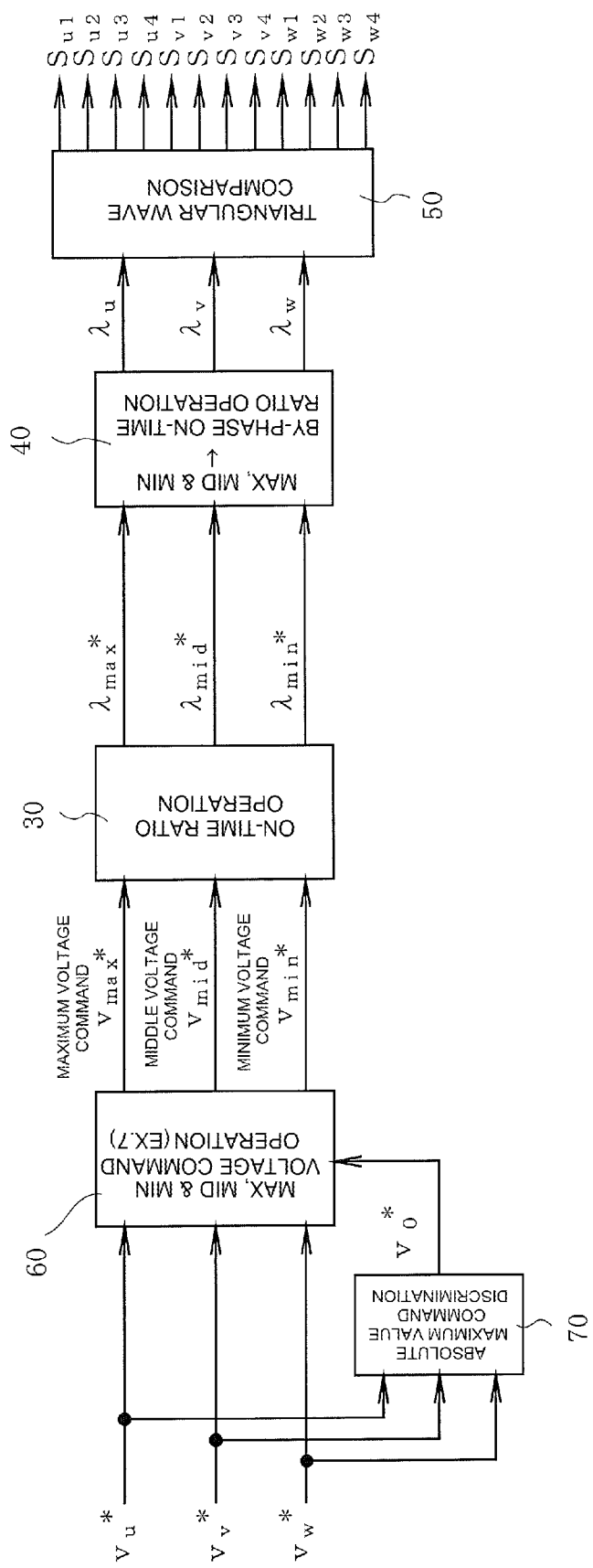
FIG. 5 is a functional block diagram showing a configuration of a control system according to a second embodiment of the invention.

FIG. 5 is a functional block diagram showing a configuration of a control system according to a second embodiment (corresponding to the fourth to the sixth aspects) of the invention. The control system, like the control system according to the first embodiment, is formed with hardware and software of a microcomputer system. Also the embodiment will be explained as a control system of the three-level inverter shown in FIG. 14. The embodiment, however, can be of course applied also to the control of the three-level inverter shown in FIG. 13.

Figure 6:
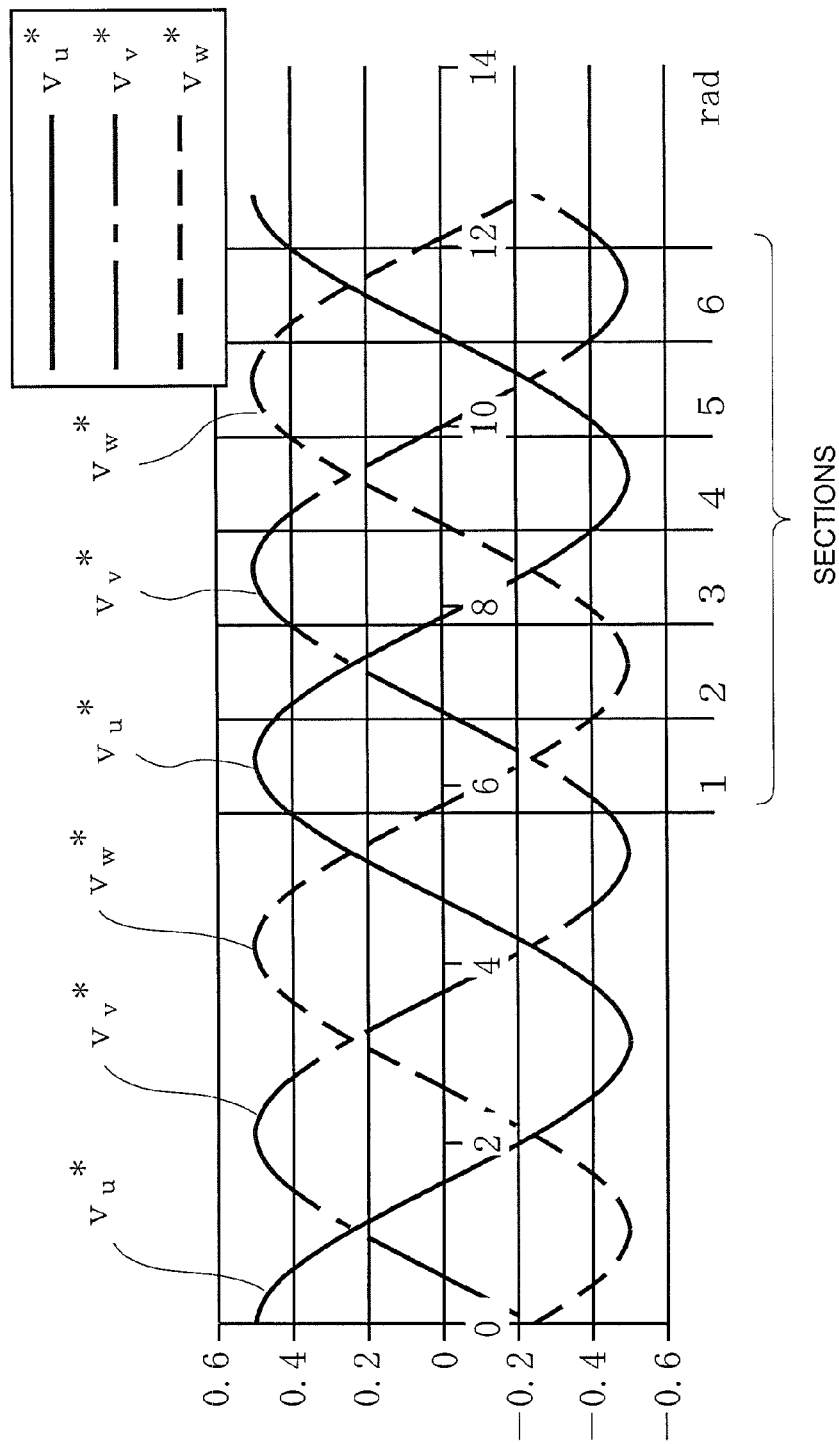
FIG. 6 is a waveform diagram showing the waveforms of three-phase output voltage commands $v_u^*$, $v_v^*$ and $v_w^*$ in the control system according to the second embodiment.

FIG. 6 is a waveform diagram showing the waveforms of three-phase output voltage commands $v_u^*$, $v_v^*$ and $v_w^*$ in the control system according to the second embodiment.

In FIG. 5, constituents with similar functions to those of constituents shown in FIG. 1 will be denoted with similar reference numerals and signs. In the following, explanations will be made with particular emphasis on parts different from those shown in FIG. 1.

In FIG. 5, reference numeral 60 denotes a maximum, middle and minimum voltage command operating means, to which three-phase AC output voltage commands $v_u^*$, $v_v^*$ and $v_w^*$ shown in FIG. 6 are inputted like in the first embodiment.

In each of sections to be explained later, from the inputted three-phase AC output voltage commands $v_u^*$, $v_v^*$ and $v_w^*$, an absolute maximum value command discriminating means 70 detects a voltage command having an absolute maximum value as an absolute maximum voltage command $v_{max}$. From the detected absolute maximum voltage command $v_{max}$ and the polarity (sign) thereof, the absolute maximum value command discriminating means 70 further obtains an absolute maximum voltage command $v_0^*$ as a compensation value to be explained later and output it to the maximum, middle and minimum voltage command operating means 60.

As is shown in FIG. 6, the one period of each of the voltage commands is divided into six, from the section 1 to the section 6. With respect to each section, the maximum, middle and minimum voltage command operating means 60, according to a selection table given as Table 2, determines a phase with stopped switching and a voltage level produced in the phase before carrying out operations for obtaining $v_{max}^*$, $v_{mid}^*$ and $\lambda_{min}^*$ as being maximum, middle and minimum voltage commands, respectively, which will be explained later.

TABLE 2

| SECTION | ABSOLUTE MAX. VOLTAGE COMMAND $v_{max}$ | SIGN OF $v_{MAX}$ Sign | PHASE WITH STOPPED SWITCHING AND VOLTAGE LEVEL PRODUCED IN THE PHASE |
|---|---|---|---|
| 1 | $v_u^*$ | + | U-PHASE, Ed |
| 2 | $v_w^*$ | − | W-PHASE, -Ed |
| 3 | $v_v^*$ | + | V-PHASE, Ed |
| 4 | $v_u^*$ | − | U-PHASE, -Ed |
| 5 | $v_w^*$ | + | W-PHASE, Ed |
| 6 | $V_v^*$ | − | V-PHASE, -Ed |

For example, in the section 1 shown in FIG. 6, the voltage command $v_u^*$ in the U-phase has the maximum value with the absolute value thereof also being maximum compared with the voltage command $v_v^*$ in the V-phase and the voltage command $v_w^*$ in the W-phase. Therefore, of the switching elements connected to the U-phase output terminal in the DC circuit shown in FIG. 14, the switching element $S_1$ between the U-phase output terminal and the DC high voltage $E_d$ is made to be turned-on over one switching period to thereby produce the voltage $E_d$ at the U-phase output terminal. At this time, the switching elements $S_3$ and $S_4$ are made to be turned-off for preventing the DC power supply from being short-circuited and the switching element $S_2$ is made to be turned-on for being brought into a fly-wheeling mode.

In the section 2 shown in FIG. 6, the voltage command $v_w^*$ in the W-phase has the minimum value with the absolute value thereof being maximum compared with the voltage command $v_u^*$ in the U-phase and the voltage command $v_v^*$ in the V-phase. Therefore, of the switching elements connected to the W-phase output terminal in the DC circuit shown in FIG. 14, the switching element $S_4$ between the W-phase output terminal and the low DC voltage $-E_d$ (Although FIG. 14 shows the DC circuit in the U-phase, the DC circuit in the W-phase has a configuration identical to the DC circuit shown in FIG. 14. Therefore, the switching element is to be denoted as $S_4$ here) is made to be turned-on over one switching period to thereby produce the voltage $-E_d$ at the W-phase output terminal. At this time, the switching elements $S_1$ and $S_2$ are made to be turned-off for preventing the DC power supply from being short-circuited and the switching element $S_3$ is made to be turned-on for being brought into a fly-wheeling mode.

The operations of the absolute maximum value command discriminating means 70 and the maximum, middle and minimum voltage command operating means 60 will be further explained as follows.

The absolute maximum value command discriminating means 70 obtains the absolute maximum voltage command $v_0^*$ as a compensation value by the expression (6):

$$v_0^* = \text{sign}(v_{max})E_d - v_{max} \qquad (6)$$

where sign($v_{max}$) represents the polarity of the voltage command $v_{max}$ with the absolute value thereof becoming maximum, which becomes 1 when $v_{max}$ is positive and becomes −1 when $v_{max}$ is negative. Therefore, when $v_{max}$ is positive, $v_0^*$ is provided as $v_0^*=E_d-v_{max}$ and, when $v_{max}$ is negative, $v_0^*$ is provided as $v_0^*=-(|E_d|-|v_{max}|)$.

Next to this, the maximum, middle and minimum voltage command operating means 60 classifies the original output voltage commands $v_u^*$, $v_v^*$ and $v_w^*$ by value into an absolute maximum voltage command $v_{max}$, a middle voltage command $v_{mid}$ and a minimum voltage command $v_{min}$ in each section like in the first embodiment. With respect to thus classified voltage commands, the maximum, middle and minimum voltage command operating means 60 carries out operations of compensating them with the absolute maximum voltage command $v_0^*$ obtained by the expression (6) as are expressed by the following expressions (7) to obtain a maximum voltage command $v_{max}^*$, a middle voltage command $v_{mid}^*$ and a minimum voltage command $v_{min}^*$. With the absolute maximum voltage command $v_0^*$ obtained by the expression (6), the maximum voltage command $v_{max}^*$ in the expressions (7) becomes $E_d$ or $-E_d$:

$$\left. \begin{aligned} v_{max}^* &= v_{max} + v_0^* = \text{sign}(v_{max})E_d \\ v_{mid}^* &= v_{mid} + v_0^* \\ v_{min}^* &= v_{min} + v_0^* \end{aligned} \right\} \quad (7)$$

Figure 7:
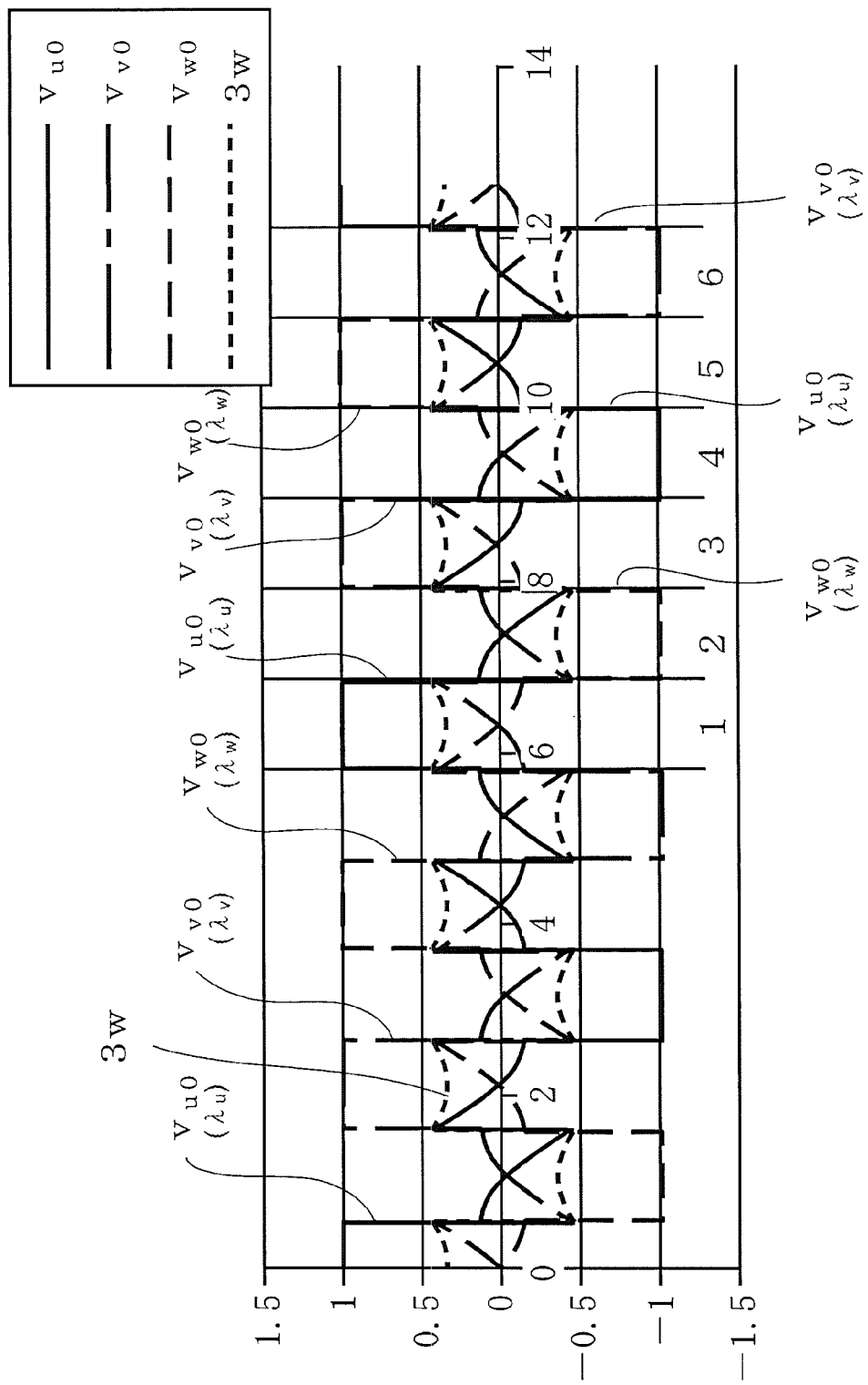
FIG. 7 is a waveform diagram showing the waveforms of voltage commands $v_{u0}$, $v_{v0}$ and $v_{w0}$ after the output voltage commands $v_u^*$, $v_v^*$ and $v_w^*$ shown in FIG. 6 are compensated, respectively, together with the waveform of a zero-phase voltage command 3w in the second embodiment.
Figure 8C:
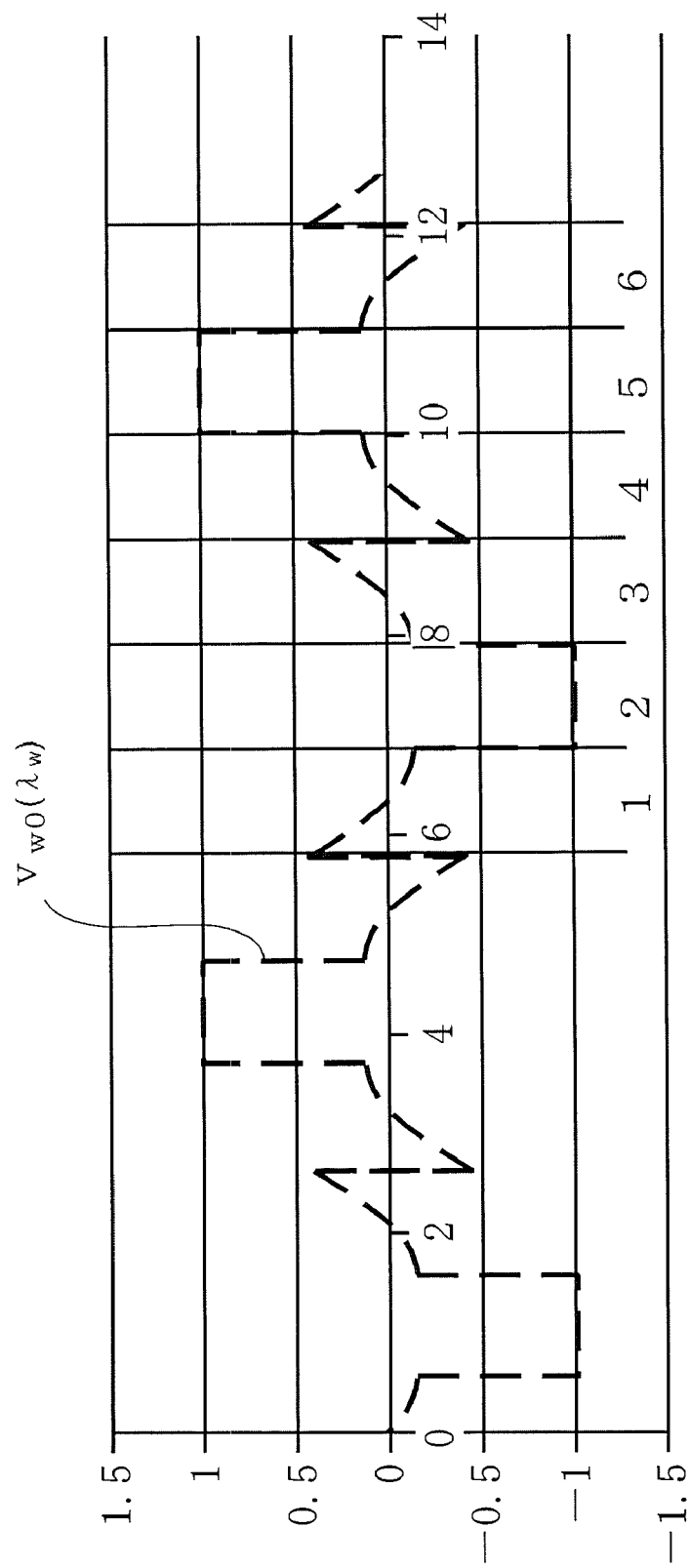
FIG. 8C is a waveform diagram showing the waveform of the voltage command $v_{w0}$ taken out from FIG. 7.

FIG. 7 is a waveform diagram showing the waveforms of voltage commands $v_{u0}$, $v_{v0}$ and $v_{w0}$ after the output voltage commands $v_u^*$, $v_v^*$ and $v_w^*$ shown in FIG. 2 are compensated according to the expressions (7). For easy understanding, the waveforms of the voltage commands $v_{u0}$, $v_{v0}$ and $v_{w0}$ shown in FIG. 7 are shown in FIG. 8A, FIG. 8B and FIG. 8C, respectively. In addition, FIG. 8D shows only a zero-phase voltage command 3w shown in FIG. 7. The zero-phase voltage command 3w, when expressed according to the expressions (7), becomes as $0+v_0^*=v_0^*$, which is equivalent to the absolute maximum voltage command $v_0^*$ given by the expression (6).

However, since the zero-phase voltage is the reference voltage for a voltage in each phase, then, in a line-to-line voltage as a difference between a voltage in a certain phase and a voltage in another phase, the zero-phase voltages with respect to their respective voltages cancel out each other. Therefore, in each of the voltage commands $v_{u0}$, $v_{v0}$ and $v_{w0}$ which is provided as the difference between the voltage command in a certain phase and the voltage command in another phase as is expressed in the expressions (7), the zero-phase voltage commands 3w cancel out each other. Thus, the control of an output voltage according to each of the voltage commands $v_{u0}$, $v_{v0}$ and $v_{w0}$ will be unaffected by the zero-phase voltage command 3w.

As is apparent from FIG. 7 and FIGS. 8A to 8C, in the section 1 to section 6, in a phase in which the absolute value of a voltage command is maximum (hereinafter referred to as an "absolute maximum value phase"), the value of the maximum voltage command $v_{max}^*$ is 1 or -1 when letting the value of the voltage $E_d$ be 1. For example, as the maximum voltage command $v_{max}^*$, the voltage command $v_{u0}$ with the value 1 in the U-phase is outputted in the section 1, the voltage command $v_{w0}$ with the value -1 in the W-phase is outputted in the section 2 and the voltage command $v_{v0}$ with the value 1 in the V-phase is outputted in the section 3.

That is, by fixing the value of the voltage command in a phase with the absolute value of the voltage command being maximum in each section at 1 or -1, as was shown in the foregoing Table 2, the switching operation in the phase is stopped, by which the DC high voltage Ed or the low DC voltage -Ed is to be continuously outputted.

Subsequent to this, as is shown in FIG. 5, to an on-time ratio operating means 30, the maximum voltage command $v_{max}^*$, middle voltage command $v_{mid}^*$ and minimum voltage command $v_{min}^*$ in each section are inputted which are those after being compensated. The on-time ratio operating means 30 carries out operations by the following expressions (8) with the values of the middle voltage command $v_{mid}^*$ and minimum voltage command $v_{min}^*$ of the voltage commands and the values of the DC voltages Ed and –Ed in the DC circuit of the inverter to obtain on-time ratios $\lambda_{mid}^*$ and $\lambda_{min}^*$. The on-time ratio $\lambda_{mid}^*$ is the ratio of a time, during which the switching element in a phase with the absolute value of the middle voltage command $v_{mid}^*$ being a middle value (hereinafter referred to as an "absolute middle value phase") is turned-on, to the one switching period. While, the on-time ratio $\lambda_{min}^*$ is the ratio of a time, during which the switching element in a phase with the absolute value of the minimum voltage command $v_{min}^*$ being a minimum value (hereinafter referred to as an "absolute minimum value phase") is turned-on, to the one switching period:

$$\left. \begin{aligned} \lambda_{mid}^* &= v_{mid}^*/E_d \\ \lambda_{min}^* &= v_{min}^*/E_d \end{aligned} \right\} \quad (8)$$

where each of $\lambda_{max}^*$ and $\lambda_{min}^*$ has a positive value between 1 and 0. As is apparent from the expressions (8), the on-time ratios $\lambda_{max}^*$ and $\lambda_{min}^*$ are proportional to the absolute value of the middle voltage command $v_{max}^*$ and the absolute value of the minimum voltage command $v_{min}^*$, respectively. In addition, in a phase with the maximum voltage command $v_{max}^*$, the on-time ratio $\lambda_{max}^*$ becomes 1 when the maximum voltage command $v_{max}^*$ is positive, with which the switching element $S_1$ is made to be turned-on, and becomes 0 when the maximum voltage command $v_{max}^*$ is negative, with which the switching element $S_4$ is made to be turned-on.

Here, consider the on-time ratio in the one switching period of each of switching elements in each phase.

In the section 1, as is shown in FIG. 8A, the voltage command $v_{u0}$ in the U-phase is the maximum voltage command $v_{max}^*$ with the absolute value thereof being maximum. Thus, the on-time ratio of the switching element $S_1$ becomes 1 in the DC circuit with respect to the U-phase in an inverter shown in FIG. 14. In this case, as was explained in the foregoing, the on-time ratios of the switching elements $S_3$ and $S_4$ become zero and the on-time ratio of the switching element $S_2$ becomes 1. From the foregoing, the respective on-time ratios $\lambda_{uS1}$ to $\lambda_{uS4}$ of the switching elements $S_1$ to $S_4$ in the U-phase as the absolute maximum value phase are expressed as the expressions (9):

$$\left. \begin{aligned} \lambda_{uS1} &= 1 \\ \lambda_{uS2} &= 1 \\ \lambda_{uS3} &= 0 \\ \lambda_{uS4} &= 0 \end{aligned} \right\} \quad (9)$$

In the section 2, as is shown in FIG. 8C, the voltage command $v_{w0}$ in the W-phase is the maximum voltage command $v_{max}^*$ in the absolute maximum value phase with the polarity thereof being negative. Thus, the respective on-time ratios $\lambda_{wS1}$ to $\lambda_{wS4}$ of the switching elements $S_1$ to $S_4$ in the W-phase as the absolute maximum value phase are expressed as the expressions (10):

$$\left.\begin{array}{l}\lambda_{wS1} = 0 \\ \lambda_{wS2} = 0 \\ \lambda_{wS3} = 1 \\ \lambda_{wS4} = 1\end{array}\right\} \quad (10)$$

In addition, in the section 1, as is shown in FIGS. 8B and 8C, the middle voltage command $v_{mid}^*$ in the absolute middle value phase shifts from the voltage command $v_{w0}$ in the W-phase to the voltage command $v_{v0}$ in the V-phase with the polarities thereof being positive. Therefore, switching is carried out between the DC high voltage $E_d$ and the DC middle voltage, i.e. zero voltage. For such switching, the respective on-time ratios $\lambda_{midS1}$ to $\lambda_{midS4}$ of the switching elements $S_1$ to $S_4$ in the DC circuit in each of the W-phase and the V-phase as the absolute middle value phase are expressed as the expressions (11):

$$\left.\begin{array}{l}\lambda_{midS1} = \lambda_{mid}^* \\ \lambda_{midS2} = 1 \\ \lambda_{midS3} = 1 - \lambda_{mid}^* \\ \lambda_{midS4} = 0\end{array}\right\} \quad (11)$$

Furthermore, in the section 1, as is also shown in FIGS. 8B and 8C, the minimum voltage command $v_{min}^*$ in the absolute minimum value phase shifts from the voltage command $v_{v0}$ in the V-phase to the voltage command $v_{w0}$ in the W-phase with the polarities thereof being negative. Therefore, switching is carried out between the DC middle voltage, i.e. zero voltage and the DC low voltage $-E_d$. For such switching, the respective on-time ratios $\lambda_{minS1}$ to $\lambda_{minS4}$ of the switching elements $S_1$ to $S_4$ in the DC circuit in each of the V-phase and the W-phase as the absolute minimum value phase are expressed as the expressions (12):

$$\left.\begin{array}{l}\lambda_{minS1} = 0 \\ \lambda_{minS2} = 1 - \lambda_{min}^* \\ \lambda_{minS3} = 1 \\ \lambda_{minS4} = \lambda_{min}^*\end{array}\right\} \quad (12)$$

The on-time ratio operating means 30 shown in FIG. 5 outputs the on-time ratios $\lambda_{max}^*$, $\lambda_{mid}^*$ and $\lambda_{min}^*$ obtained from the inputted maximum voltage command $v_{max}^*$, middle voltage command $v_{mid}^*$ and minimum voltage command $v_{min}^*$, respectively.

A by-phase on-time ratio operating means 40 converts the on-time ratios $\lambda_{max}^*$, $\lambda_{mid}^*$ and $\lambda_{min}^*$ in each of the foregoing sections, which ratios are inputted to the means 40 while being classified by value, into on-time ratios $\lambda_u$, $\lambda_v$ and $\lambda_w$ classified by phase of the U, V and W. As was explained in the foregoing, the on-time ratios $\lambda_{mid}^*$ and $\lambda_{min}^*$ are proportional to the middle voltage command $v_{mid}^*$ and the minimum voltage command $v_{min}^*$, respectively, and the value of the on-time ratio $\lambda_{max}^*$ is 1 or zero. Therefore, the waveforms of the on-time ratios $\lambda_u$, $\lambda_v$ and $\lambda_w$ are geometrically similar to the waveforms of the voltage commands $v_{u0}$, $v_{v0}$ and $v_{w0}$ shown in FIGS. 8A, 8B and 8C, respectively.

However, the on-time ratios corresponding to the negative voltage commands become positive.

A triangular wave comparison means 50 as a carrier comparison means compares the waveforms of the on-time ratios $\lambda_u$, $\lambda_v$ and $\lambda_w$ in their respective U-, V- and W-phases with a triangular wave as a carrier to obtain on-off commands for the switching elements in the DC circuit of the inverter in each of the U-, V- and W-phases from the result of the comparison and outputs the obtained commands. Like in FIG. 1 showing the configuration of the control system according to the first embodiment, signs $S_{u1}$ to $S_{w4}$ designate on-off commands outputted from the triangular wave comparison means 50. Of the on-off commands $S_{u1}$ to $S_{w4}$, the on-off commands $S_{u1}$ to $S_{u4}$ are the on-off commands to four switching elements (corresponding to the switching elements $S_1$ to $S_4$ shown in FIG. 14) in the DC circuit in the U-phase, the on-off commands $S_{v1}$ to $S_{v4}$ are the on-off commands to four switching elements in the DC circuit in the V-phase not shown, and the on-off commands $S_{w1}$ to $S_{w4}$ are the on-off commands to four switching elements in the DC circuit in the V-phase not shown.

Figure 9C:
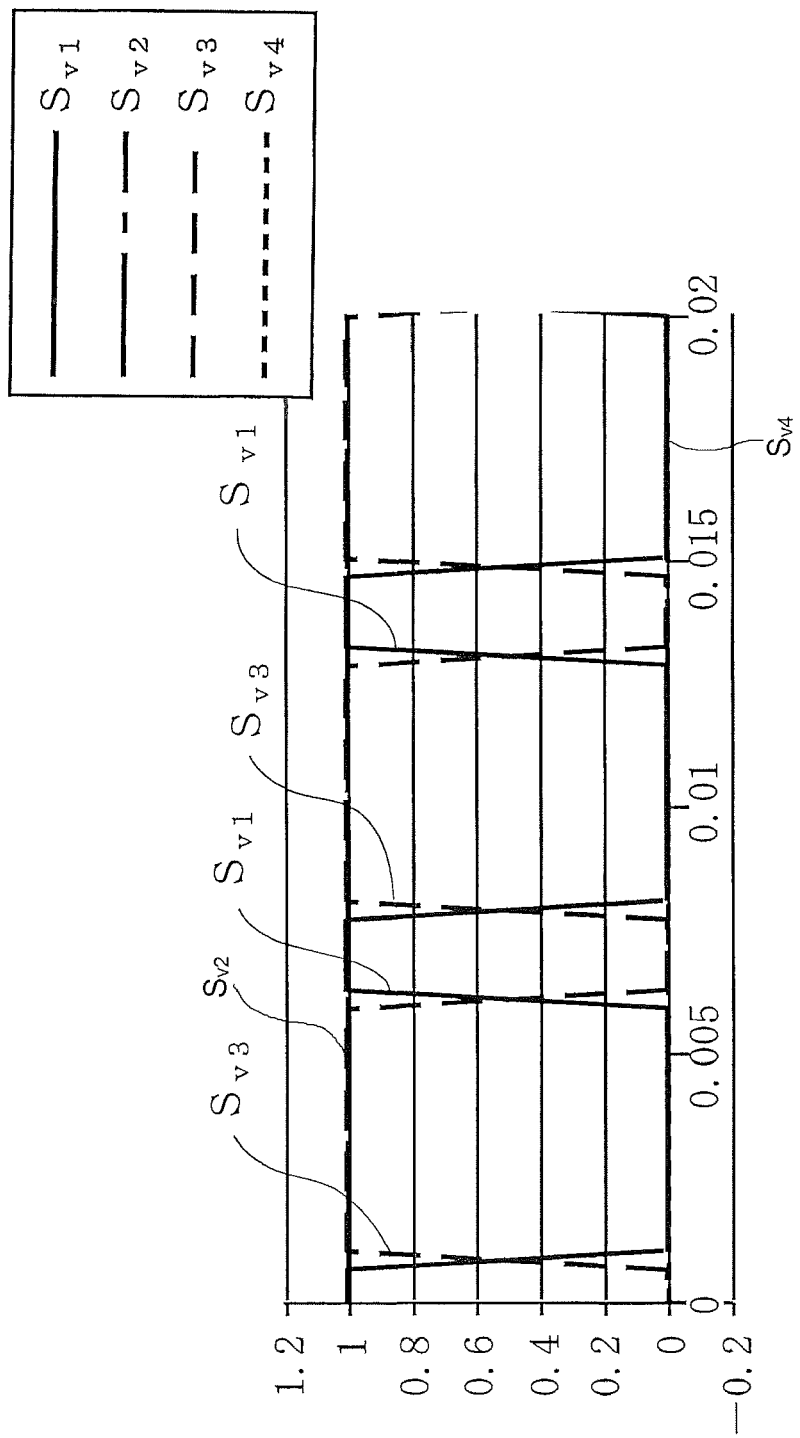
FIG. 9C is a waveform diagram showing the waveforms of the on-off commands in the V-phase according to the second embodiment.

FIGS. 9A-9D are waveform diagrams showing the operation of the triangular wave comparing means 50 according to the second embodiment in a part of the section 1, with FIG. 9A showing the waveforms of the on-time ratios $\lambda_u$, $\lambda_v$, $\lambda_w$ in the U-, V- and W-phases, respectively, together with the waveform of the triangular wave as a carrier, FIG. 9B showing the waveforms of the on-off commands $S_{u1}$ to $S_{u4}$ to the switching elements in the inverter in the U-phase, FIG. 9C showing the waveforms of the on-off commands $S_{v1}$ to $S_{v4}$ to the switching elements in the inverter in the V-phase, and FIG. 9D showing the waveforms of the on-off commands $S_{w1}$ to $S_{w4}$ to the switching elements in the inverter in the W-phase. That is, FIGS. 9B-9D show the turned-on and -off states of the switching elements in the U-, V- and W-phases, respectively. Here, "a part of the section 1" is the part from 0 to 0.02 in the section 1 when letting the length (time length) of the section 1 shown in FIG. 6 to FIG. 8D be unity. In the following explanations, the reference signs of the on-off commands $S_{u1}$ to $S_{u4}$, $S_{v1}$ to $S_{v4}$ and $S_{w1}$ to $S_{w4}$ are to be also used as the reference signs of the switching elements.

Like in the first embodiment, by using an up-down counter, a carrier of a triangular wave is formed which moves between 0 and 1 as is shown in FIG. 9A. The time length from the time at which the carrier initiates an increase from zero to the time at which the carrier returns to zero again after reaching 1 and then turning back therefrom becomes the one switching period.

Like in the first embodiment, the triangular wave comparison means 50 shown in FIG. 5 is also formed by using a comparator contained in a device such as a microcomputer, with which means the values of the on-time ratios $\lambda_u$, $\lambda_v$ and $\lambda_w$, corresponding to the values of the waveforms of the voltage commands $v_{u0}$, $v_{v0}$, $v_{w0}$ in the U-, V- and W-phases shown in FIGS. 8A to 8C, respectively, are compared with the value of the triangular wave as a carrier as is shown in FIG. 9A. The period of the triangular wave is equivalent to the one switching period of the switching element.

In the part of the section 1 shown in FIG. 9A, the on-time ratio $\lambda_u$ is shown as the on-time ratio $\lambda_{max}^*(=1)$ corresponding to the voltage command $v_{u0}$ as the maximum voltage command $v_{max}^*(=1)$. The on-time ratio $\lambda_v$ is shown as the on-time ratio $\lambda_{min}^*$ corresponding to the voltage command $v_{v0}$ as the minimum voltage command $v_{min}^*$ before the voltage command $v_{v0}$ is shifted to the middle voltage command $v_{mid}^*$, and the on-time ratio $\lambda_w$ is shown as the on-time ratio $\lambda_{mid}*$ corresponding to the voltage command $v_{w0}$ as the minimum voltage command $\lambda_{mid}*$ before the voltage command $v_{w0}$ is shifted to the minimum voltage command $v_{min}*$. Here, however, the on-time ratio $\lambda_v$ as the on-time ratio $X_{min}*$ corresponding to the voltage command $v_{v0}$ being the negative minimum voltage command $v_{min}*$, is shown as being positive according to the expressions (8).

In addition, the part of the section 1 shown in FIGS. 9A-9D is the part from 0 to 0.02 to the 1 as the length of the section 1, i.e. a very short part of only 2% of the section 1. Therefore, in such a short part, the waveform of the on-time ratio can be regarded as a straight line approximately representing a constant value and in parallel to the horizontal axis.

Like in the first embodiment, by the comparison between the value of the on-time ratio and the value of the carrier as the triangular wave, the time during which the value of the on-time ratio is equal to or more than the value of the carrier in the one switching period of the carrier, i.e. the one switching period of a switching element, is determined as the time during which the switching element is made turned-on with the on-time ratio by an on-off command.

In this way, by using one carrier signal of a triangular wave, on-off commands, each having a determined on-time ratio, are formed with respect to each of the phases as is shown in FIGS. 9B-9D.

As is shown in FIG. 9A, in the section 1, the on-time ratio $\lambda_u$ has the maximum value. Therefore, in FIG. 9B, waveforms of the on-off commands $S_{u1}$ to $S_{u4}$, which are for carrying out switching of the switching elements $S_{u1}$ to $S_{u4}$ in the V-phase with the on-time ratios $\lambda_{uS1}$ to $\lambda_{uS4}$, respectively, being provided by the expressions (9), are shown in the part of the section 1.

Namely, the on-time ratios $\lambda_{uS1}$ and $\lambda_{uS2}$ of the on-off commands $S_{u1}$ and $S_{u2}$ are left at 1 according to the expressions $\lambda_{uS1}=1$ and $\lambda_{uS2}=1$, respectively, which are provided by the expressions (9) and the on-time ratios $\lambda_{uS3}$ and $\lambda_{uS4}$ of the on-off commands $S_{u3}$ and $S_{u4}$ are left at 0 according to the expressions $X_{uS3}=0$ and $\lambda_{uS4}=0$, respectively, which are provided by the expressions (9). This makes the switching elements $S_{ui}$ and $S_{u2}$ left turned-on and the switching elements $S_{u3}$ and $S_{u4}$ left turned-off. In this way, in the U-phase, all of the switching elements $S_{u1}$ to $S_{u4}$ carry out no switching with the number of switching in the one switching period being zero.

Here, in FIG. 9B, the waveforms (characteristic lines) of the on-off commands $S_{u1}$ and $S_{u2}$ to their respective switching elements $S_{u1}$ and $S_{u2}$ coincide with each other and the waveforms (characteristic lines) of the on-off commands $S_{u3}$ and $S_{u4}$ to their respective switching elements $S_{u3}$ and $S_{u4}$ coincide with each other.

In FIG. 9C, waveforms of the on-off commands $S_{v1}$ to $S_{v4}$, which are for carrying out switching of the switching elements $S_{v1}$ to $S_{v4}$ in the V-phase with the on-time ratios $\lambda_{midS1}$ to $\lambda_{midS4}$ respectively, being provided by the expressions (11), are shown in the part of the section 1.

This makes each of the switching elements $S_{v1}$ and $S_{v3}$ carry out two times of switching, four times in total of both, in the one switching period.

Compared with this, the on-time ratio $\lambda_{midS2}$ of the on-off command $S_{v2}$ is left at 1 according to the expression $\lambda_{midS2}=1$ provided by the expressions (11) and the on-time ratio $\lambda_{midS4}$ of the on-off command $S_{v4}$ is left at 0 according to the expression $\lambda_{midS4}=0$ provided by the expressions (11). That is, the switching elements $S_{v2}$ and $S_{v4}$ carry out no switching.

In FIG. 9D, waveforms of the on-off commands $S_{w1}$ to $S_{w4}$, which are for carrying out switching of the switching elements $S_{w1}$ to $S_{w4}$ in the W-phase with the on-time ratios $\lambda_{minS1}$ to $\lambda_{minS4}$, respectively, being provided by the expressions (12), are shown in the part of the section 1.

This makes each of the switching elements $S_{w2}$ and $S_{w4}$ carry out two times of switching, four times in total of both, in the one switching period like the switching elements $S_{u1}$ and $S_{u3}$ in the U-phase.

Compared with this, the on-time ratio $\lambda_{minS1}$ of the on-off command $S_{w1}$ is left at 0 according to the expression $\lambda_{minS1}=0$ provided by the expressions (12) and the on-time ratio $\lambda_{minS3}$ of the on-off command $S_{w3}$ is left at 1 according to the expression $\lambda minS3=1$ provided by the expressions (12). That is, the switching elements $S_{w1}$ and $S_{w3}$ carry out no switching.

By the switching operation like in the foregoing, a train of rectangular waves each with an on-time ratio changing with time, that is, a train of rectangular waves each with a width proportional to the value of the compensated voltage command changing with time, are formed with respect to each of three phases of the U-, V- and W-phases. The train of the rectangular waves are subjected to known demodulating processing to be converted into a three-level AC voltage.

Therefore, also in the first embodiment, like in the first embodiment, the three-level inverter can be controlled by carrying out switching of eight times per switching period.

Moreover, the carrier of the triangular wave can be easily produced to make it possible to form the control device at a low cost.

Furthermore, in the second embodiment, no restriction is imposed on the amplitude of a voltage command, namely the value of a voltage that can be outputted from a three-level inverter.

Figure 10:
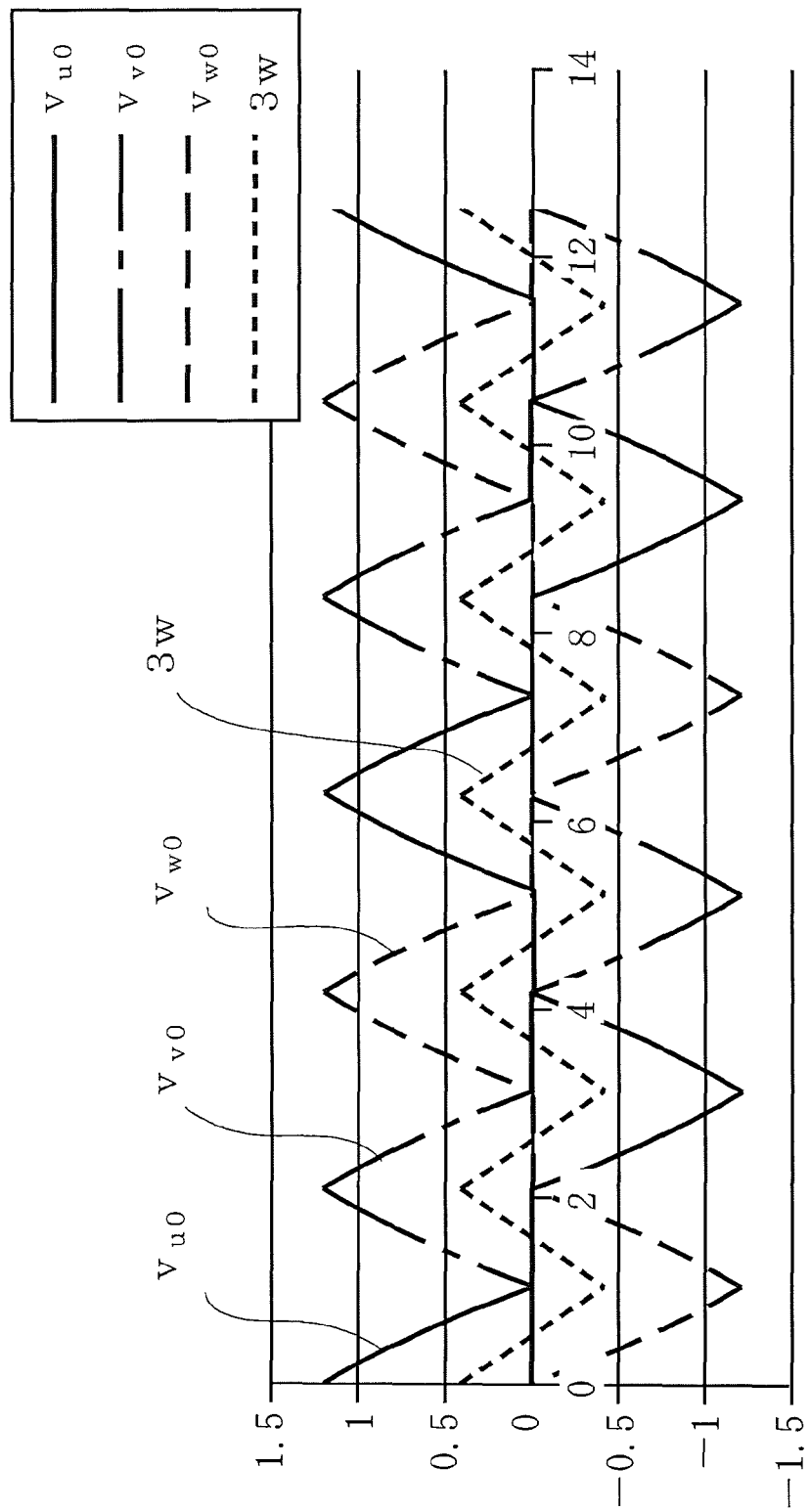
FIG. 10 is a waveform diagram showing the waveforms of voltage commands $v_{u0}$, $v_{v0}$ and $v_{w0}$ after the output voltage commands $v_u^*$, $v_v^*$ and $v_w^*$ shown in FIG. 2 are compensated with their respective amplitudes increased from illustrated 0.5 to 0.8 in the first embodiment.
Figure 11:
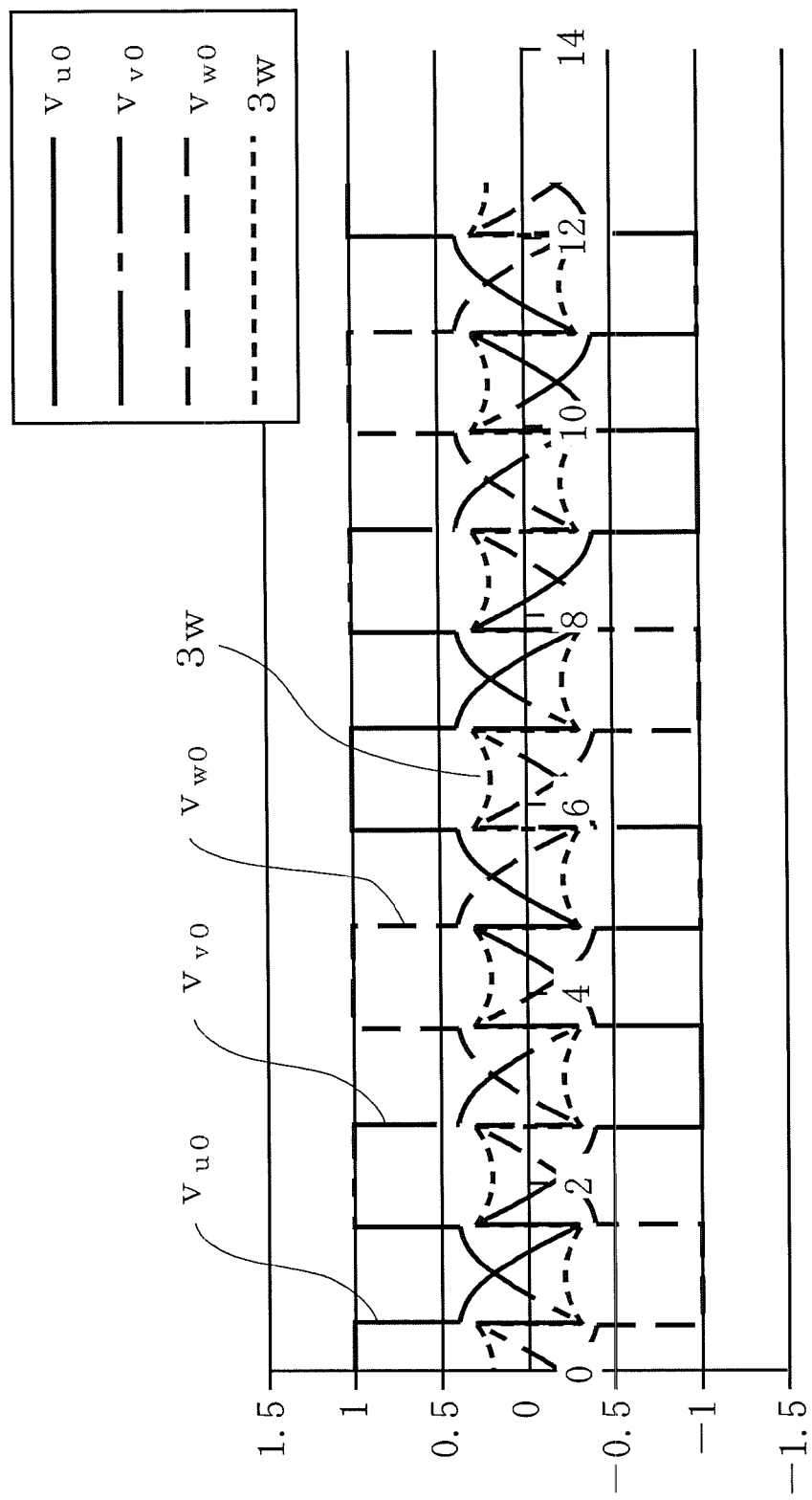
FIG. 11 is a waveform diagram showing the waveforms of voltage commands $v_{u0}$, $v_{v0}$ and $v_{w0}$ after the output voltage commands $v_u^*$, $v_v^*$ and $v_w^*$ shown in FIG. 6 are compensated with their respective amplitudes increased from illustrated 0.5 to 0.8 in the second embodiment.

FIG. 10 is a waveform diagram showing the waveforms of the voltage commands $v_{u0}$, $v_{v0}$ and $v_{w0}$ after the output voltage commands $v_u*$, $v_v*$ and $v_w*$ shown in FIG. 2 are compensated with their respective amplitudes increased from illustrated 0.5 to 0.8 (letting the DC voltage be 1, from 50% to 80% to the DC voltage) in the first embodiment. FIG. 11 is a waveform diagram showing the waveforms of voltage commands $v_{u0}$, $v_{v0}$ and $v_{w0}$ after the compensation according to the second embodiment is carried out with respect to the output voltage commands $v_u*$, $v_v*$ and $v_w*$ shown in FIG. 6 with their respective amplitudes similarly increased from illustrated 0.5 to 0.8.

As is apparent from FIG. 10, in the first embodiment, some parts of each of the voltage commands $v_{u0}$, $v_{v0}$ and $v_{w0}$ are outside the range of −1 to 1, that is, outside the DC power supply voltage ranging from $-E_d$ to $E_d$. Since the inverter cannot outputs a voltage with the absolute value thereof being larger than the power supply voltage $E_d$, the part of the voltage command with the value thereof exceeding 1 or −1 cannot produce voltages according to the command. This means that the output voltages are saturated to be distorted. This is because the compensation in the first embodiment is carried out so as to add a middle voltage command in the phase with the middle voltage command to a voltage commands in other phases as is expressed in the expressions (1) with the switching made stopped in the phase with the middle voltage command. That is, this is because in the phase with the maximum voltage command, an increased amplitude of the voltage command sometimes causes the value of the voltage command after the compensation to become larger than the value of the original maximum voltage command and exceed 1 by the addition.

Compared with this, in the second embodiment, with the value of the DC power supply voltage taken as 1, control is carried out so that the compensated value of the voltage command, the absolute value of which is maximum in each phase, becomes 1. Therefore, no voltage commands in the other phases exceed 1 to make it possible to output voltages while being limited to the value of the DC power supply voltage, by which there is no possibility of causing distortions in the output voltages.

In the first embodiment, in a region in which the amplitude of the voltage command is small, the value of the zero-phase voltage command 3w is smaller than that in the second embodiment, which provides the advantage of small potential variations in the zero-phase as a common mode that cause small noises.

Therefore, it is preferable to make use of the respective merits of the first embodiment and the second embodiment to distinguish between the use of the first embodiment and the use of the second embodiment according to the ratio of the amplitude of the voltage command to the DC power supply voltage.

Figure 12:
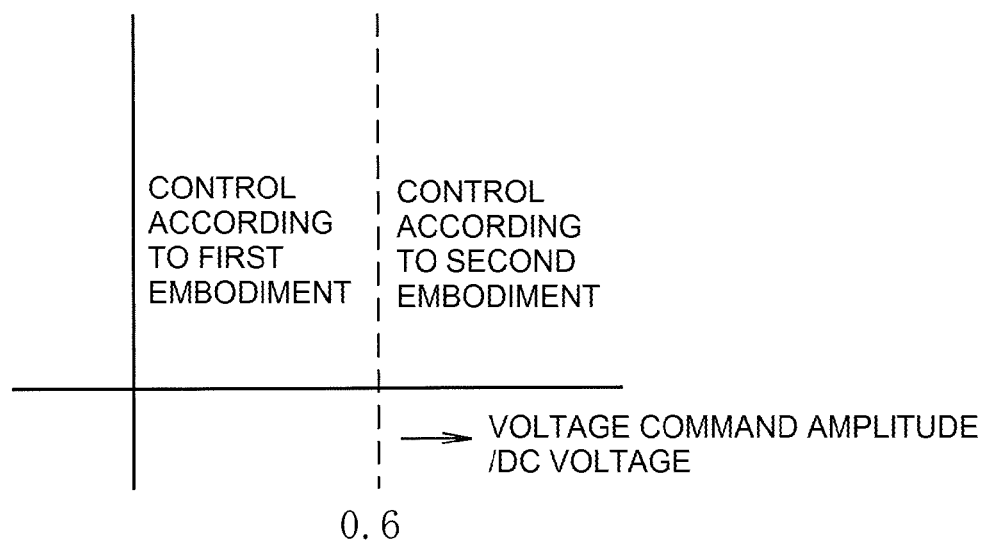
FIG. 12 is an explanatory diagram showing the discrimination for switching between the control according to the first embodiment and the control according to the second embodiment.

Namely, as is explained in the seventh aspect of the invention and shown in FIG. 12, an explanatory diagram showing the discrimination for switching between the control according to the first embodiment and the control according to the second embodiment, a discriminating means is provided for carrying out switching so that, with respect to the region in which the ratio of the amplitude as the maximum value of the voltage command to the DC power supply voltage is equal to or less than 0.6, the control of output voltages is carried out with the on-time ratios determined by the operations according to the first embodiment and, with respect to the region in which the ratio is more than 0.6, the control of output voltages is carried out with the on-time ratios determined by the operations according to the second embodiment.

The foregoing ratio 0.6 is a rough measure, which can be corrected with the voltage drops in the semiconductor switching elements and errors in detection circuits in detection circuits taken into consideration.

The switching between control according to the first embodiment and the control according to the second embodiment switches the operation procedures of the voltage commands. Then, operations of the voltages commands according to both of the embodiments are not simultaneously carried out in parallel to cause no fear of increasing the burden of operational processing in a microcomputer. Furthermore, since the foregoing switching is carried out only by switching between voltage commands to be compared with the carrier, no shock due to pulses is generated at switching.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A method for controlling a three-phase inverter that is connected to a DC power source having a high voltage DC terminal, a middle voltage DC terminal, and a low voltage DC terminal, wherein the three-phase inverter has a plurality of output terminals and includes three three-level inverters that are connected to the DC power source in parallel with one another and that have semiconductor switching elements, at least one of the semiconductor switching elements being connected between the high voltage DC terminal and one of the output terminals of the three-phase inverter, at least one of the semiconductor switching elements being connected between the middle voltage DC terminal and said one of the output terminals, and at least one of the semiconductor switching elements being connected between the low voltage DC terminal and said one of the output terminals, wherein the method makes the switching elements in the three-level inverters turn on and off on the basis of output voltage commands during a sequence of time periods to thereby generate three-phase AC voltages at the output terminals of the three-phase inverter, the method comprising:

(A) obtaining on-time ratios for the semiconductor switching elements in each of the three-level inverters on the basis of the output voltage commands;

(B) dividing the output voltage commands during a time period into a plurality of sections, wherein the time period is defined as a duration of one alternating current cycle of the output voltage commands; and (C) during each of the sections of the output voltage commands, in the three-level inverter for one of the phases, generating switching control signals to make at least one of the semiconductor switching elements that is connected between the high voltage DC terminal and said one of the output terminals to turn on and off alternately based on a respective on-time ratio, and additionally generating switching control signals to make at least one of the semiconductor switching elements that is connected between the middle voltage DC terminal and said one of the output terminals to alternately turn on and off based on a respective on-time ratio, in the three-level inverter for another of the phases, generating a switching control signal to turn on at least one semiconductor switching element that is connected between the middle voltage DC terminal and the output terminal regardless of the on-time ratios; and in the three-level inverter for the remaining phase, generating switching control signals to make at least one of the semiconductor switching elements that is connected between the middle voltage DC terminal and said one of the output terminals alternately turn on and off based on a respective on-time ratio, and additionally generating switching control signals to make at least one semiconductor switching element that is connected between the low voltage DC terminal and said one of the output terminals alternately turn on and off based on a respective on-time ratio.

2. The method of claim 1, wherein step (C) comprises the following steps for each of the sections of the output voltage command:

determining which phase has a maximum value, which phase has a minimum value, and which phase has a middle value of an output voltage command;

with respect to the phase having the maximum value, subtracting the middle value in another phase from the maximum value to provide a compensated value as a maximum output voltage command during this section for the phase having the maximum value;

with respect to the phase having the middle value, setting 0 as the value of a middle output voltage command during this section for the phase having the middle value;

with respect to the phase having the minimum value, subtracting the middle value of the output voltage command from the minimum value to provide a compensated minimum output voltage command during the section for the phase having the minimum value;

with respect to the phase with the maximum output voltage command, dividing the value of the maximum voltage command by the value of the voltage at the high voltage DC terminal to provide the on-time ratio for the at least one semiconductor switching element connected between the high voltage DC terminal and said one of the output terminals and the on-time ratio for the at least one semiconductor switching element connected between the middle voltage DC terminal and said one of the output terminals with respect to the phase having the middle value, setting 1 as the on-time ratio of the at least one semiconductor switching element connected between the middle voltage DC terminal and said one of the output terminals so as to place the at least one semiconductor switching element connected between the middle voltage DC terminal and said one of the output terminals and a turned-on state; and with respect to the phase with the minimum output voltage command, dividing the value of the minimum voltage command by the value of the voltage at the low voltage DC terminal to provide the on-time ratio for the at least one semiconductor switching element connected between the middle voltage DC terminal and said one of the output terminals and the on-time ratio for the at least one semiconductor switching element connected between the low voltage output terminal and said one of the output terminals.

3. A control system for implementing the improved control method of claim 2, comprising:

a middle phase selecting means selecting, in each of the sections, an output voltage command of a phase with the value thereof being a middle value from the output voltage commands of the three-phase AC voltage;

a maximum, middle and minimum voltage command operating means classifying, in each of the sections, the output voltage commands of the three-phase AC voltage by value into a voltage command of a phase with the value thereof being a maximum value, the selected voltage command of the phase with the value thereof being the middle value and a voltage command of a phase with the value thereof being a minimum value, and carrying out the compensation of subtracting the selected middle value from each of the classified output voltage commands to output the compensated results as a maximum voltage command, a middle voltage command with zero value and a minimum voltage command;

an on-time ratio operating means carrying out, in each of the sections, an operation of dividing the value of the inputted maximum voltage command by the value of the DC high voltage to output the result of the operation as an operated value of the on-time ratio of the at least one semiconductor switching element connected between the high voltage point of the DC circuit and the one output terminal, carrying out an operation of converting the value 0 of the inputted middle voltage command into value 1 to output the value 1 as an operated value of the on-time ratio of fixing the at least one semiconductor switching element connected between the middle voltage point of the DC circuit and the one output terminal in the turned-on state, and carrying out an operation of dividing the value of the inputted minimum voltage command by the value of the DC low voltage to output the result of the operation as an operated value of the on-time ratio of the at least one semiconductor switching element connected between the low voltage point of the DC circuit and the one output terminal;

a by-phase on-time ratio operating means classifying by phase, in each of the sections, the operated values of the on-time ratios, which are classified by values, and outputting the operated values classified by phase as voltages with the values thereof corresponding to the on-time ratios; and a carrier comparing means making, in each of the sections, the voltages, inputted by phase with the values thereof corresponding to the on-time ratios, compared with a carrier, which converts the compared voltage into an on-off command with an on-time ratio corresponding to the compared voltage, to produce on-off commands with the on-time ratios by phase and provide the on-off commands as those for a plurality of the semiconductor switching elements in each of the three three-level inverters.

4. The control system of claim 3, wherein the carrier is a triangular wave.

5. The method of claim 2, wherein said improved control method is carried out when a three-phase output control voltage command has an amplitude that does not exceed a predetermined value, and otherwise a different control method is carried out.

6. A control system for implementing the improved control method of claim 1, comprising:

a middle phase selecting means selecting, in each of the sections, an output voltage command of a phase with the value thereof being a middle value from the output voltage commands of the three-phase AC voltage;

a maximum, middle and minimum voltage command operating means classifying, in each of the sections, the output voltage commands of the three-phase AC voltage by value into a voltage command of a phase with the value thereof being a maximum value, the selected voltage command of the phase with the value thereof being the middle value and a voltage command of a phase with the value thereof being a minimum value, and carrying out the compensation of subtracting the selected middle value from each of the classified output voltage commands to output the compensated results as a maximum voltage command, a middle voltage command with zero value and a minimum voltage command;

an on-time ratio operating means carrying out, in each of the sections, an operation of dividing the value of the inputted maximum voltage command by the value of the DC high voltage to output the result of the operation as an operated value of the on-time ratio of the at least one semiconductor switching element connected between the high voltage point of the DC circuit and the one output terminal, carrying out an operation of converting the value 0 of the inputted middle voltage command into value 1 to output the value 1 as an operated value of the on-time ratio of fixing the at least one semiconductor switching element connected between the middle voltage point of the DC circuit and the one output terminal in the turned-on state, and carrying out an operation of dividing the value of the inputted minimum voltage command by the value of the DC low voltage to output the result of the operation as an operated value of the on-time ratio of the at least one semiconductor switching element connected between the low voltage point of the DC circuit and the one output terminal;

a by-phase on-time ratio operating means classifying by phase, in each of the sections, the operated values of the on-time ratios, which are classified by values, and outputting the operated values classified by phase as voltages with the values thereof corresponding to the on-time ratios; and a carrier comparing means making, in each of the sections, the voltages, inputted by phase with the values thereof corresponding to the on-time ratios, compared with a carrier, which converts the compared voltage into an on-off command with an on-time ratio corresponding to the compared voltage, to produce on-off commands with the on-time ratios by phase and provide the on-off commands as those for a plurality of the semiconductor switching elements in each of the three three-level inverters.

7. The method of claim 1, wherein said improved control method is carried out when a three-phase output control voltage command has an amplitude that does not exceed a predetermined value, and otherwise a different control method is carried out.

8. A method for controlling a three-phase inverter that is connected to a DC power source having a high voltage DC terminal, a middle voltage DC terminal, and a low voltage DC terminal, wherein the three-phase inverter has a plurality of output terminals and includes three three-level inverters that are connected to the DC power source in parallel with one another and that have semiconductor switching elements, at least one of the semiconductor switching elements being connected between the high voltage DC terminal and one of the output terminals of the three-phase inverter, at least one of the semiconductor switching elements being connected between the middle voltage DC terminal and said one of the output terminals, and at least one of the semiconductor switching elements being connected between the low voltage DC terminal and said one of the output terminals, wherein the method makes the switching elements in the three-level inverters turn on and off on the basis of output voltage commands during a sequence of time periods to thereby generate three-phase AC voltages at the output terminals of the three-phase inverter, the method comprising:

(A) obtaining on-time ratios for the semiconductor switching elements in each of the three-level inverters on the basis of the output voltage commands;

(B) dividing the output voltage commands during a time period into a plurality of sections wherein the time period is defined as a duration of one alternating current cycle of the output voltage commands; and (C) during each of the sections of the output voltage commands, in the three-level inverter for one of the phases, controlling one of the semiconductor switching elements that is connected between the high voltage DC terminal and said one of the output terminals and the at least one of the semiconductor switching elements that is connected between the low voltage DC terminal and said one of the output terminals to be in a turned-on state regardless of the on-time ratios to output one of the voltage at the high voltage DC terminal and the low voltage DC terminal, in the three-level inverter for another of the phases, generating switching control signals to make at least one of the semiconductor switching elements that is connected between the high voltage DC terminal and said one of the output terminals alternately turn on and off based on a respective on-time ratio, and additionally generating switching control signals to make at least one semiconductor switching element that is connected between the low voltage DC terminal and said one of the output terminals alternately turn on and off based on a respective on-time ratio, in the three-level inverter for the remaining phase, when the three-level inverter for another phase outputs the voltage at the high voltage DC terminal to said one of the output terminals, generating switching control signals to make at least one of the semiconductor switching elements that is connected between the low voltage DC terminal and said one of the output terminals turn on and off based on a respective on-time ratio, and additionally generating switching control signals to make at least one semiconductor switching element that is connected between the middle voltage DC terminal and said one of the output terminals alternately turn on and off based on a respective on-time ratio to alternately output the voltage at the low voltage DC terminal and the voltage at the middle voltage DC terminal, and in the three-level inverter for said remaining phase, when the three-level inverter for another phase outputs the voltage at the low voltage DC terminal to said one of the output terminals, generating switching control signals to make at least one of the semiconductor switching elements that is connected between the high voltage DC terminal and said one of the output terminals alternately turn on and off based on a respective on-time ratio, and additionally generating switching control signals to make at least one semiconductor switching element that is connected between the middle voltage DC terminal and said one of the output terminals alternately turn on and off based on a respective on-time ratio to alternately output the voltage at the high voltage DC terminal and the voltage at the middle voltage DC terminal.

9. The method of claim 8, wherein step (C) comprises the following steps for each of the sections of the output voltage command:

determining which phase has a maximum value, which phase has a minimum value, and which phase has a middle value of an output voltage command;

when the output voltage command has the positive polarity and the absolute value of the maximum value of the output voltage command, with respect to a phase with the output voltage command having the positive polarity and the absolute value of the maximum value, making the value of the DC high voltage as the maximum value of the compensated voltage command, providing the value of the DC high voltage as the maximum voltage command in the phase in the section, carrying out an operation of dividing the maximum voltage command by the value of the DC high voltage and, on the basis of the result of the division, providing 1 as the on-time ratio of fixing the at least one semiconductor switching element connected between the low voltage point and the output terminal in the turned-on state in the three-level inverter in the phase;

with respect to a phase with the value of the output voltage command being a middle value, carrying out compensation of adding the difference between the value of the DC high voltage and the maximum value of the output voltage command to the middle value of the voltage command, providing the value of the compensated voltage command as the value of the middle voltage command in the phase in the section, carrying out an operation of dividing the value of the middle voltage command by the value of the DC high voltage and, on the basis of the result of the division and the polarity of the middle voltage command, providing the on-time ratio of one of the at least one semiconductor switching element connected between the high voltage point and the output terminal in the three-level inverter in the phase and the at least one semiconductor switching element connected between the low voltage point and the output terminal in the inverter in the phase and the on-time ratio of the at least one semiconductor switching element connected between the middle voltage point and the output terminal in the inverter in the phase;

with respect to a phase with the value of the output voltage command being a minimum value, carrying out compensation of adding the difference between the value of the DC high voltage and the maximum value of the output voltage command to the minimum value of the voltage command, providing the value of the compensated voltage command as the value of the minimum voltage command in the phase in the section, carrying out an operation of dividing the value of the minimum voltage command by the value of the DC high voltage and, on the basis of the result of the division and the polarity of the minimum voltage command, providing the on-time ratio of one of the at least one semiconductor switching element connected between the high voltage point and the output terminal in the three-level inverter in the phase and the at least one semiconductor switching element connected between the high voltage point and the output terminal in the inverter in the phase and the on-time ratio of the at least one semiconductor switching element connected between the minimum voltage point and the output terminal in the inverter in the phase;

when the output voltage command has the negative polarity and the absolute value of the maximum value of the output voltage command, with respect to a phase with the output voltage command having the negative polarity and the absolute value of the maximum value, making the absolute value of the DC low voltage as the maximum value of the compensated voltage command, providing the absolute value of the DC low voltage as the maximum voltage command in the phase in the section, carrying out an operation of dividing the absolute value of the maximum voltage command by the absolute value of the DC low voltage and, on the basis of the result of the division, providing 1 as the on-time ratio of fixing the at least one semiconductor switching element connected between the low voltage point and the output terminal in the turned-on state in the three-level inverter in the phase;

with respect to a phase with the value of the output voltage command being a middle value, carrying out compensation of subtracting the difference between the absolute value of the DC low voltage and the maximum value of the output voltage command from the middle value of the voltage command, providing the value of the compensated voltage command as the value of the middle voltage command in the phase in the section, carrying out an operation of dividing the value of the middle voltage command by the absolute value of the DC low voltage and, on the basis of the result of the division and the polarity of the middle voltage command, providing the on-time ratio of one of the at least one semiconductor switching element connected between the high voltage point and the output terminal in the three-level inverter in the phase and the at least one semiconductor switching element connected between the low voltage point and the output terminal in the inverter in the phase and the on-time ratio of the at least one semiconductor switching element connected between the middle voltage point and the output terminal in the inverter in the phase; and with respect to a phase with the value of the output voltage command being a minimum value, carrying out compensation of subtracting the difference between the absolute value of the DC low voltage and the maximum value of the output voltage command to the minimum value of the voltage command, providing the value of the compensated voltage command as the value of the minimum voltage command in the phase in the section, carrying out an operation of dividing the value of the minimum voltage command by the absolute value of the DC low voltage and, on the basis of the result of the division and the polarity of the middle voltage command, providing the on-time ratio of one of the at least one semiconductor switching element connected between the high voltage point and the output terminal in the three-level inverter in the phase and the at least one semiconductor switching element connected between the low voltage point and the output terminal in the inverter in the phase and the on-time ratio of the at least one semiconductor switching element connected between the minimum voltage point and the output terminal.

10. A control system for implementing the improved control method of claim 9, comprising:

an absolute maximum value command discriminating means detecting, in each of the sections, an output voltage command of a phase with an absolute value of the maximum value from the output voltage commands of the three-phase AC voltage and carrying out an operation for providing a compensation value for the output voltage commands on the basis of the maximum value and the polarity thereof;

a maximum, middle and minimum voltage command operating means classifying, in each of the sections, the output voltage commands of the three-phase AC voltage by value into a voltage command of a phase with the value thereof being a maximum value, a voltage command of the phase with the value thereof being the middle value and a voltage command of a phase with the value thereof being a minimum value, carrying out the compensation of adding the compensation value when the polarity of the maximum value is positive and subtracting the compensation value when the polarity of the maximum value is negative, and outputting the compensated results as a maximum voltage command with the value thereof being one of the value of the DC high voltage and the absolute value of the DC low voltage, a middle voltage command and a minimum voltage command;

an on-time ratio operating means carrying out, in each of the sections, an operation of dividing the value of the inputted maximum voltage command by the value of one of the value of the DC high voltage and the absolute value of the DC low voltage on the basis of the polarity of the maximum value to convert the value of the inputted maximum voltage command to 1 to output the result of the operation as an operated value of the on-time ratio of fixing the at least one semiconductor switching element connected between one of the high voltage point and the low voltage point and the one output terminal in the turned-on state, carrying out an operation of dividing the value of the inputted middle voltage command by one of the value of the DC high voltage and the absolute value of the DC low voltage on the basis of the polarity of the maximum value to output the result of the operation as an operated value of the on-time ratio of the at least one semiconductor switching element connected between one of the high voltage point and the low voltage point of the DC circuit and the one output terminal, and carrying out an operation of dividing the value of the inputted minimum voltage command by one of the value of the DC high voltage and the absolute value of the DC low voltage on the basis of the polarity of the maximum value to output the result of the operation as an operated value of the on-time ratio of the at least one semiconductor switching element connected between one of the high voltage point and the low voltage point of the DC circuit and the one output terminal;

a by-phase on-time ratio operating means classifying by phase, in each of the sections, the operated values of the on-time ratios, which are classified by values, and outputting the operated values classified by phase as voltages with the values thereof corresponding to the on-time ratios; and a carrier comparing means making, in each of the sections, the voltages, inputted by phase with the values thereof corresponding to the on-time ratios, compared with a carrier, which converts the compared voltage into an on-off command with an on-time ratio corresponding to the compared voltage, to produce on-off commands with the on-time ratios by phase and provide the on-off commands as those for a plurality of the semiconductor switching elements in each of the three three-level inverters.

11. The control system of claim 10, wherein the carrier is a triangular wave.

12. A control system for implementing the method of claim 8, comprising:

an absolute maximum value command discriminating means detecting, in each of the sections, an output voltage command of a phase with an absolute value of the maximum value from the output voltage commands of the three-phase AC voltage and carrying out an operation for providing a compensation value for the output voltage commands on the basis of the maximum value and the polarity thereof;

a maximum, middle and minimum voltage command operating means classifying, in each of the sections, the output voltage commands of the three-phase AC voltage by value into a voltage command of a phase with the value thereof being a maximum value, a voltage command of the phase with the value thereof being the middle value and a voltage command of a phase with the value thereof being a minimum value, carrying out the compensation of adding the compensation value when the polarity of the maximum value is positive and subtracting the compensation value when the polarity of the maximum value is negative, and outputting the compensated results as a maximum voltage command with the value thereof being one of the value of the DC high voltage and the absolute value of the DC low voltage, a middle voltage command and a minimum voltage command;

an on-time ratio operating means carrying out, in each of the sections, an operation of dividing the value of the inputted maximum voltage command by the value of one of the value of the DC high voltage and the absolute value of the DC low voltage on the basis of the polarity of the maximum value to convert the value of the inputted maximum voltage command to 1 to output the result of the operation as an operated value of the on-time ratio of fixing the at least one semiconductor switching element connected between one of the high voltage point and the low voltage point and the one output terminal in the turned-on state, carrying out an operation of dividing the value of the inputted middle voltage command by one of the value of the DC high voltage and the absolute value of the DC low voltage on the basis of the polarity of the maximum value to output the result of the operation as an operated value of the on-time ratio of the at least one semiconductor switching element connected between one of the high voltage point and the low voltage point of the DC circuit and the one output terminal, and carrying out an operation of dividing the value of the inputted minimum voltage command by one of the value of the DC high voltage and the absolute value of the DC low voltage on the basis of the polarity of the maximum value to output the result of the operation as an operated value of the on-time ratio of the at least one semiconductor switching element connected between one of the high voltage point and the low voltage point of the DC circuit and the one output terminal;

a by-phase on-time ratio operating means classifying by phase, in each of the sections, the operated values of the on-time ratios, which are classified by values, and outputting the operated values classified by phase as voltages with the values thereof corresponding to the on-time ratios; and a carrier comparing means making, in each of the sections, the voltages, inputted by phase with the values thereof corresponding to the on-time ratios, compared with a carrier, which converts the compared voltage into an on-off command with an on-time ratio corresponding to the compared voltage, to produce on-off commands with the on-time ratios by phase and provide the on-off commands as those for a plurality of the semiconductor switching elements in each of the three three-level inverters.

* * * * *